US012632806B2

(12) United States Patent
Chaudhary et al.

(10) Patent No.: US 12,632,806 B2
(45) Date of Patent: May 19, 2026

(54) MULTI-SIGNAL LEARNING SYSTEM

(71) Applicant: BOLD Limited, Hamilton (BM)

(72) Inventors: Kompal Chaudhary, Greater Noida (IN); Harshit Kauths, Delhi (IN); Amber Jiva, Chicago, IL (US); Nimit Jain, New Delhi (IN)

(73) Assignee: BOLD Limited, Hamilton (BM)

( * ) Notice: Subject to any disclaimer, the term of this patent is extended or adjusted under 35 U.S.C. 154(b) by 0 days.

(21) Appl. No.: 18/666,797

(22) Filed: May 16, 2024

(65) Prior Publication Data

US 2025/0356277 A1     Nov. 20, 2025

(51) Int. Cl.
G06Q 10/0631     (2023.01)
G06Q 10/1053     (2023.01)

(52) U.S. Cl.
CPC . G06Q 10/063112 (2013.01); G06Q 10/1053 (2013.01)

(58) Field of Classification Search
CPC ............... G06F 40/30; G06Q 10/1053; G06Q 10/063112
See application file for complete search history.

(56) References Cited

U.S. PATENT DOCUMENTS

| | | |
|---|---|---|
| 11,238,410 B1 | 2/2022 | Wright |
| 2014/0324721 A1 | 10/2014 | Rennison et al. |

| | | | |
|---|---|---|---|
| 2020/0104421 A1* | 4/2020 | Meng ..................... | G06N 20/00 |
| 2020/0160252 A1* | 5/2020 | Sahni ............. | G06Q 10/063112 |
| 2020/0311683 A1* | 10/2020 | Chua ....................... | G06F 18/22 |
| 2021/0319334 A1* | 10/2021 | Mitchell .................. | G06N 5/04 |
| 2023/0125711 A1* | 4/2023 | Li ........................... | G06F 40/30 |
| | | | 704/9 |
| 2023/0394609 A1* | 12/2023 | Robinson ....... | G06Q 10/063112 |

OTHER PUBLICATIONS

Gugnani, Akshay, and Hemant Misra. "Implicit skills extraction using document embedding and its use in job recommendation." Proceedings of the AAAI conference on artificial intelligence. vol. 34. No. 08. 2020. (Year: 2020).*

(Continued)

*Primary Examiner* — Johnna R Loftis

(74) *Attorney, Agent, or Firm* — Dinsmore & Shohl LLP

(57)     ABSTRACT

Certain aspects of the present disclosure provide techniques for providing job skill recommendations for an electronic document. Certain aspects include obtaining work history statements, a current job title, and an experience level, querying curated skills datasets to return a first skill set, generating, with an artificial intelligence model, work history embeddings based on the work history statements, generating, with the artificial intelligence model, skill embeddings based on the curated skills datasets, determining a similarity score between the work history embeddings and the skill embeddings, selecting, for a second skill set, second job skills, identifying common skills between the first skill set and the second skill set, merging the first skill set and the second skill set to form a merged skill set, sorting the merged skill set into an ordered list and populating sections of the electronic document by selecting at least one skill from the ordered list.

20 Claims, 9 Drawing Sheets

(56) References Cited

OTHER PUBLICATIONS

Gugnani, Akshay. Misra, Hemant. Implicit Skills Extraction Using Document Embedding and Its Use in Job Recommendation. The Thirty-Second Innovative Applications of Artificial Intelligence Conference. 2020 (Year: 2020).*

A. Mankawade, V. Pungliya, R. Bhonsle, S. Pate, A. Purohit and A. Raut, "Resume Analysis and Job Recommendation," 2023 IEEE 8th International Conference for Convergence in Technology (I2CT), Lonavla, India, 2023, (Year: 2023).*

Notice of Transmittal of the International Search Report and the Written Opinion of the International Searching Authority mailed on Jul. 30, 2025 relating to International Application No. PCT/US2025/024090 (10 pages).

* cited by examiner

| | Creation Date | USERID (Anonymized) | Total Experience | Relevant Experience | Job Title | Skill(s) |
|---|---|---|---|---|---|---|
| 0 | April 1, 2019 | ASDF123 | 3 | 0.5 | Dog Walker | Problem solving |
| 1 | April 1, 2022 | ASDF123 | 3 | 2.5 | Pet Sitter | Event organization |
| 2 | April 1, 2022 | ASDF123 | 3 | 2.5 | Pet Sitter | Bilingual (English, Spanish) |
| 3 | April 1, 2022 | ASDF123 | 3 | 2.5 | Pet Sitter | Relationship building |
| 4 | April 1, 2022 | ASDF123 | 3 | 2.5 | Pet Sitter | Regulating schedules |

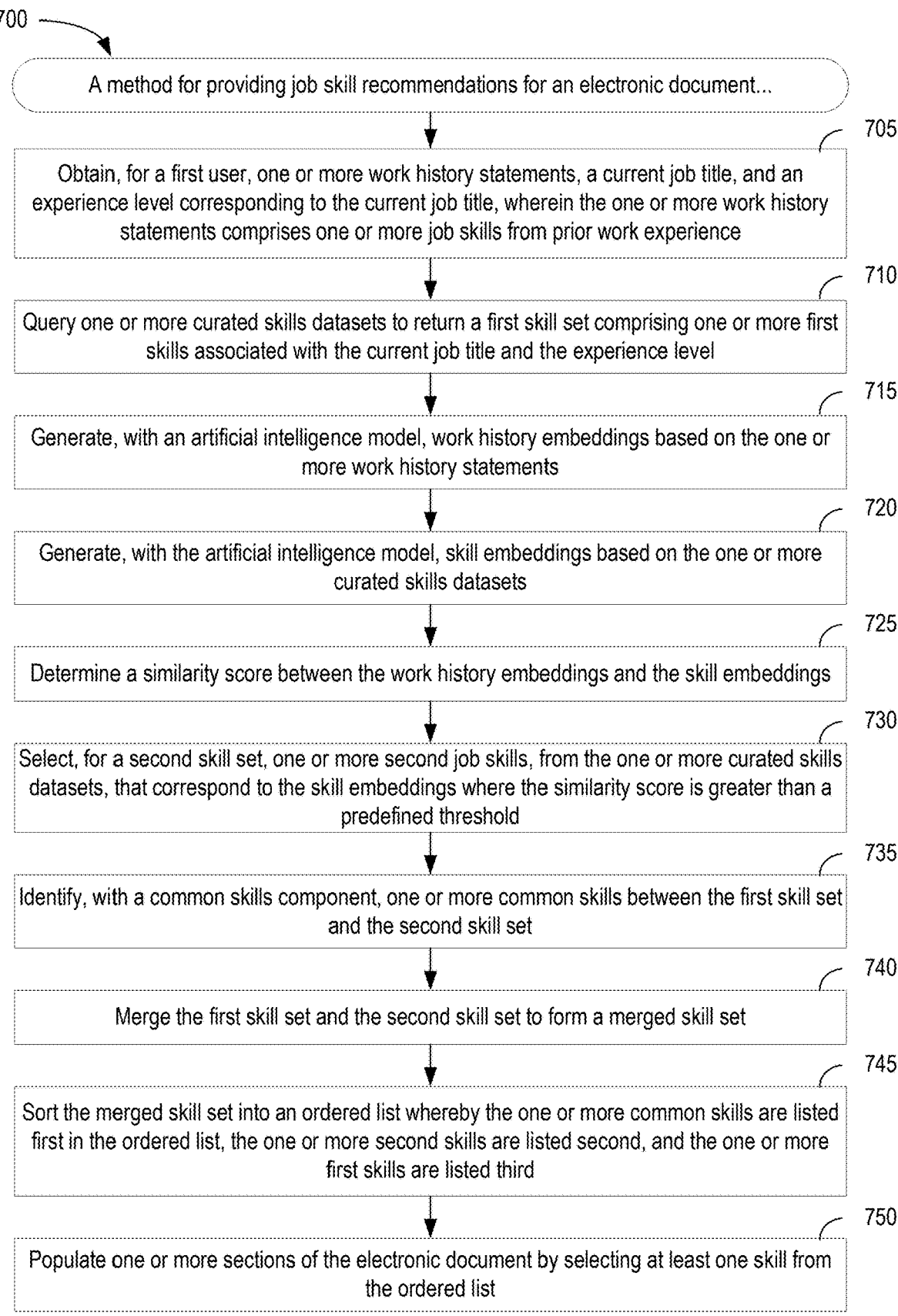

A method for providing job skill recommendations for an electronic document...

705

Obtain, for a first user, one or more work history statements, a current job title, and an experience level corresponding to the current job title, wherein the one or more work history statements comprises one or more job skills from prior work experience

710

Query one or more curated skills datasets to return a first skill set comprising one or more first skills associated with the current job title and the experience level

715

Generate, with an artificial intelligence model, work history embeddings based on the one or more work history statements

720

Generate, with the artificial intelligence model, skill embeddings based on the one or more curated skills datasets

725

Determine a similarity score between the work history embeddings and the skill embeddings

730

Select, for a second skill set, one or more second job skills, from the one or more curated skills datasets, that correspond to the skill embeddings where the similarity score is greater than a predefined threshold

735

Identify, with a common skills component, one or more common skills between the first skill set and the second skill set

740

Merge the first skill set and the second skill set to form a merged skill set

745

Sort the merged skill set into an ordered list whereby the one or more common skills are listed first in the ordered list, the one or more second skills are listed second, and the one or more first skills are listed third

750

Populate one or more sections of the electronic document by selecting at least one skill from the ordered list

*FIG. 7*

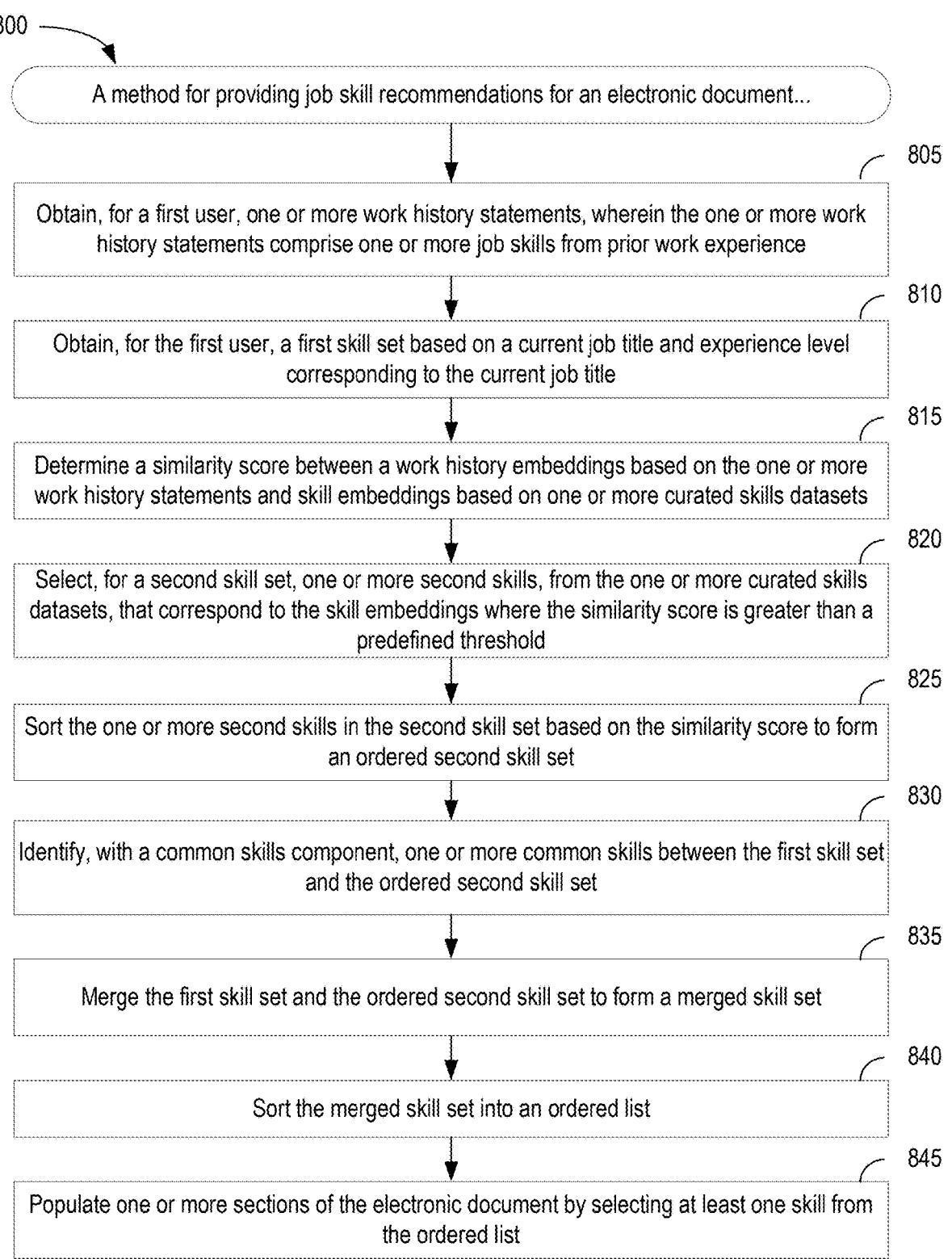

800

A method for providing job skill recommendations for an electronic document...

805

Obtain, for a first user, one or more work history statements, wherein the one or more work history statements comprise one or more job skills from prior work experience

810

Obtain, for the first user, a first skill set based on a current job title and experience level corresponding to the current job title

815

Determine a similarity score between a work history embeddings based on the one or more work history statements and skill embeddings based on one or more curated skills datasets

820

Select, for a second skill set, one or more second skills, from the one or more curated skills datasets, that correspond to the skill embeddings where the similarity score is greater than a predefined threshold

825

Sort the one or more second skills in the second skill set based on the similarity score to form an ordered second skill set

830

Identify, with a common skills component, one or more common skills between the first skill set and the ordered second skill set

835

Merge the first skill set and the ordered second skill set to form a merged skill set

840

Sort the merged skill set into an ordered list

845

Populate one or more sections of the electronic document by selecting at least one skill from the ordered list

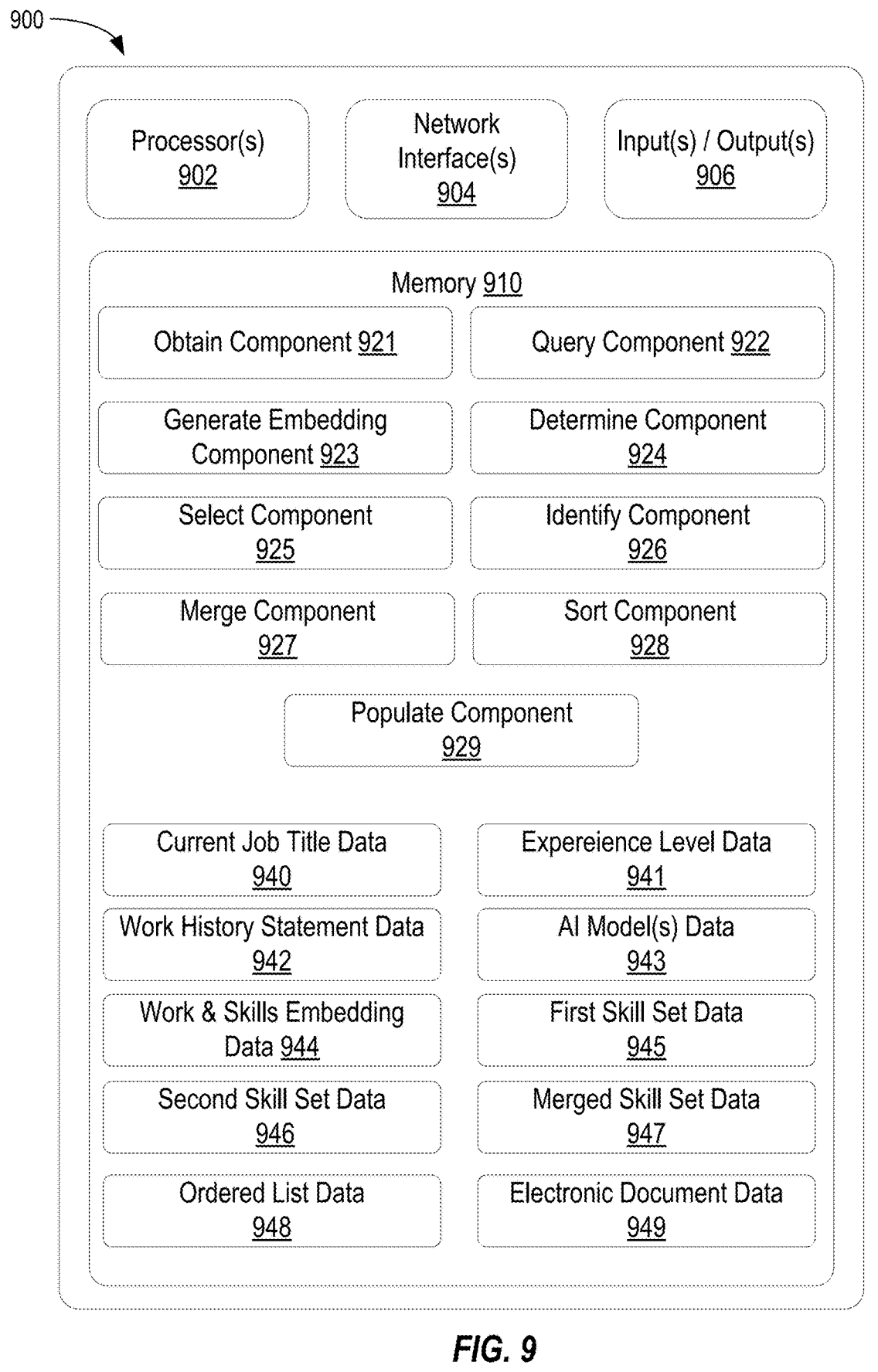

| | | |
|---|---|---|
| Processor(s) 902 | Network Interface(s) 904 | Input(s) / Output(s) 906 |

Memory 910

| | |
|---|---|
| Obtain Component 921 | Query Component 922 |
| Generate Embedding Component 923 | Determine Component 924 |
| Select Component 925 | Identify Component 926 |
| Merge Component 927 | Sort Component 928 |

Populate Component 929

| | |
|---|---|
| Current Job Title Data 940 | Expereience Level Data 941 |
| Work History Statement Data 942 | AI Model(s) Data 943 |
| Work & Skills Embedding Data 944 | First Skill Set Data 945 |
| Second Skill Set Data 946 | Merged Skill Set Data 947 |
| Ordered List Data 948 | Electronic Document Data 949 |

*FIG. 9*

MULTI-SIGNAL LEARNING SYSTEM

INTRODUCTION

Technical Field

The present specification relates to systems and methods for creating an online document such as a résumé or a job application with recommended skills.

BACKGROUND

Electronic documents are frequently submitted by users through a document submission system (e.g., a website or other online system) for review and processing. By way of example, a job seeker will typically prepare a precisely formatted résumé, cover letter, job application, or the like (e.g., as a Microsoft® Word DOCX or Adobe Acrobat® PDF file) that they may upload and submit as part of an online job application (e.g., through an employer's website, a job application board, a social media platform, or the like). The application, including the documents uploaded by the job seeker, will frequently be forwarded to and processed through an applicant tracking system (ATS), or other document review system, which may allow a recruiter or human resources (HR) personnel at a hiring entity to review the application and take appropriate action (e.g., contacting the job applicant to schedule an interview, requesting additional information, etc.). The ATS may process the uploaded documents in order to facilitate review by the recruiter or human resource (HR) personnel, for example, by generating a document "preview" that the recruiter may view and interact with through a portal provided by the ATS system. The ATS may also process the uploaded documents to automatically extract information therefrom to be used by the ATS system, and may rely on a document parsing system or integrated parsing software to do so.

Traditional document submission and review systems collect and disseminate information contained in the electronic document, which is heavily summarized and does not contain any further explanation. For example, a résumé entry for work history typically includes a few short bullet points summarizing the employee's responsibilities leaving many important details out. Furthermore, processes for developing or recommending content to a job seeker are limited to the job titles and do not provide personalized content that aligns with a job seekers work history.

There is an opportunity to improve electronic document generation such as the creation of a résumé, cover letter, job application, or the like for a job applicant with more personalized, valuable, and insightful content.

BRIEF SUMMARY

One aspect provides a method for providing job skill recommendations for an electronic document. The method includes obtaining, for a first user, one or more work history statements, a current job title, and an experience level corresponding to the current job title, wherein the one or more work history statements comprises one or more job skills from prior work experience; querying one or more curated skills datasets to return a first skill set comprising one or more first skills associated with the current job title and the experience level; generating, with an artificial intelligence model, work history embeddings based on the one or more work history statements; generating, with the artificial intelligence model, skill embeddings based on the one or more curated skills datasets; determining a similarity score between the work history embeddings and the skill embeddings; selecting, for a second skill set, one or more second job skills, from the one or more curated skills datasets, that correspond to the skill embeddings where the similarity score is greater than a predefined threshold; identifying, with a common skills component, one or more common skills between the first skill set and the second skill set; merging the first skill set and the second skill set to form a merged skill set; sorting the merged skill set into an ordered list whereby the one or more common skills are listed first in the ordered list, the one or more second skills are listed second, and the one or more first skills are listed third; and populating one or more sections of the electronic document by selecting at least one skill from the ordered list.

Another aspect provides a method for providing job skill recommendations for an electronic document. The method includes obtaining, for a first user, one or more work history statements, wherein the one or more work history statements comprise one or more job skills from prior work experience; obtaining, for the first user, a first skill set based on a current job title and experience level corresponding to the current job title; determining a similarity score between a work history embeddings based on the one or more work history statements and skill embeddings based on one or more curated skills datasets; selecting, for a second skill set, one or more second skills, from the one or more curated skills datasets, that correspond to the skill embeddings where the similarity score is greater than a predefined threshold; sorting the one or more second skills in the second skill set based on the similarity score to form an ordered second skill set; identifying, with a common skills component, one or more common skills between the first skill set and the ordered second skill set; merging the first skill set and the ordered second skill set to form a merged skill set; sorting the merged skill set into an ordered list. The one or more common skills are listed first, whereby repeated skills in each of the one or more common skills is removed. The one or more second skills are listed second, wherein the one or more second skills are listed based on an ordered corresponding to the ordered second skill set, and one or more first skills from the first skill set are listed third. The method further includes populating one or more sections of the electronic document by selecting at least one skill from the ordered list.

These and additional features provided by the embodiments described herein will be more fully understood in view of the following detailed description, in conjunction with the drawings.

Other aspects provide: one or more apparatuses operable, configured, or otherwise adapted to perform any portion of any method described herein (e.g., such that performance may be by only one apparatus or in a distributed fashion across multiple apparatuses); one or more non-transitory, computer-readable media comprising instructions that, when executed by one or more processors of one or more apparatuses, cause the one or more apparatuses to perform any portion of any method described herein (e.g., such that instructions may be included in only one computer-readable medium or in a distributed fashion across multiple computer-readable media, such that instructions may be executed by only one processor or by multiple processors in a distributed fashion, such that each apparatus of the one or more apparatuses may include one processor or multiple processors, and/or such that performance may be by only one apparatus or in a distributed fashion across multiple apparatuses); one or more computer program products embodied on one or more computer-readable storage media comprising code for performing any portion of any method described herein (e.g., such that code may be stored in only one computer-readable medium or across computer-readable media in a distributed fashion); and/or one or more apparatuses comprising one or more means for performing any portion of any method described herein (e.g., such that performance would be by only one apparatus or by multiple apparatuses in a distributed fashion). By way of example, an apparatus may comprise a processing system, a device with a processing system, or processing systems cooperating over one or more networks. An apparatus may comprise one or more memories; and one or more processors configured to cause the apparatus to perform any portion of any method described herein. In some examples, one or more of the processors may be preconfigured to perform various functions or operations described herein without requiring configuration by software.

The following description and the appended figures set forth certain features for purposes of illustration.

DESCRIPTION OF THE DRAWINGS

The embodiments set forth in the drawings are illustrative and exemplary in nature and are not intended to limit the subject matter defined by the claims. The following detailed description of the illustrative embodiments can be understood when read in conjunction with the following drawings, where like structure is indicated with like reference numerals and in which:

FIG. 4 depicts an illustrative example of curated job-skill data, according to one or more embodiments shown and described herein.

FIG. 7 depicts a flowchart of a method for generating skill recommendations, according to one or more embodiments shown and described herein.

FIG. 8 depicts a flowchart of a method for generating skill recommendations, according to one or more embodiments shown and described herein.

FIG. 9 schematically depicts an example computing device configured to perform processes of the document creation system, according to one or more embodiments shown and described herein.

DETAILED DESCRIPTION

Figure 1:
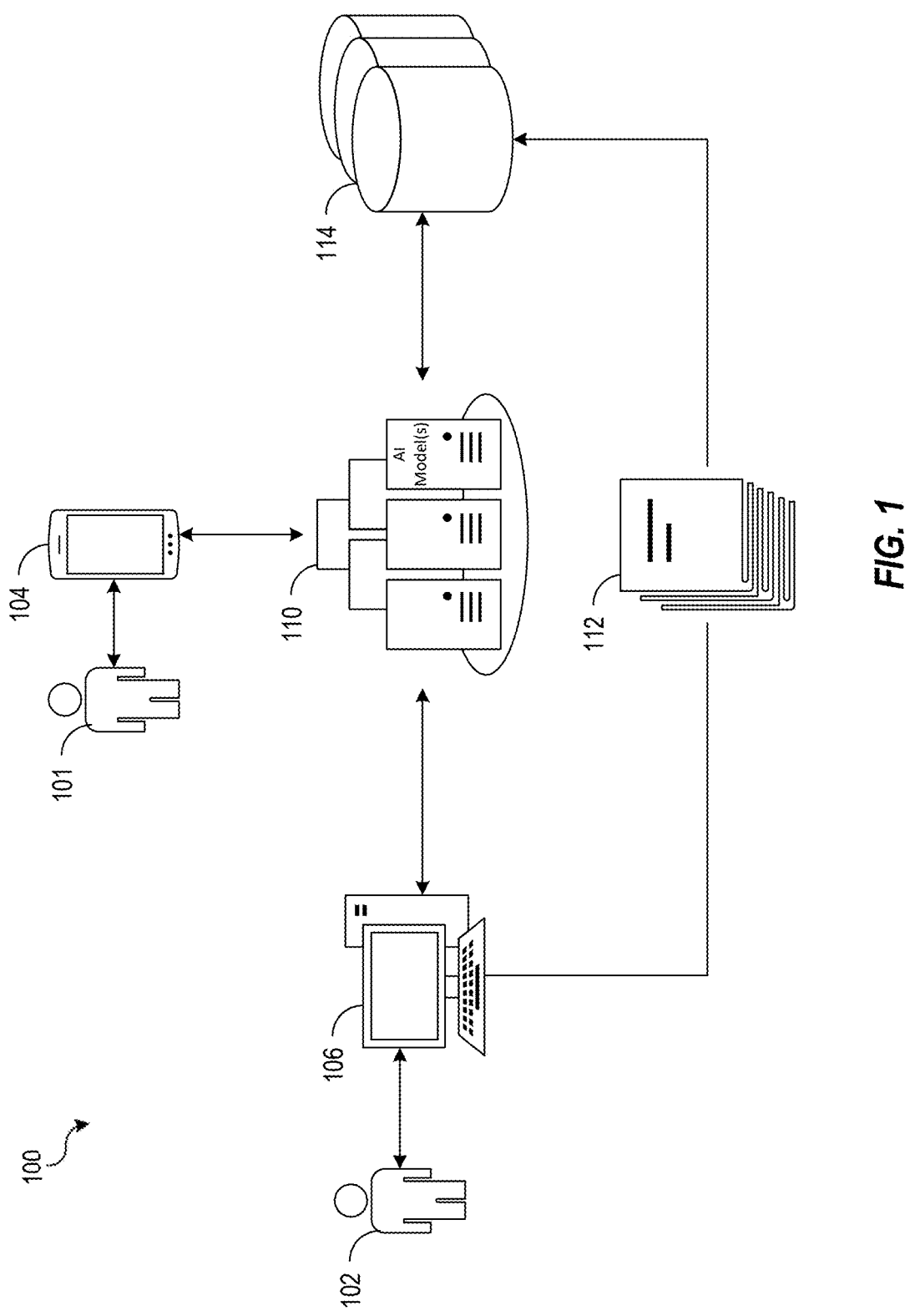
FIG. 1 depicts an example document creation system configured to perform skill recommendation processes, according to one or more embodiments shown and described herein.

Aspects of the present disclosure provide apparatuses, methods, processing systems, and computer-readable mediums for generating skill recommendations based on multiple factors including, for example, current job title, experience level corresponding to the current job title, and one or more work history statements. Techniques described herein utilize specially programmed processing device(s) to formulate skill recommendations corresponding for a user and complete one or more portions of an online form such as a résumé, cover letter, a job application, or the like.

Current processes for creating electronic documents such as résumés employ simplistic criteria, such as keywords or user job titles, resulting in generic content recommendations. The conventional processes overlook the intricacies of user behavior, preferences, and interests, ultimately leading to suboptimal content suggestions that do not align with users' needs and objectives, such as creating an electronic document having relevant information such as relevant skills corresponding to their work history. Electronic documents, such as résumés, job applications, and cover letters, containing skills that are relevant to their work history can improve the probability that a user is not screened out by résumé parsing software can be greatly increased. That is, résumés created using aspects of the present disclosure use the most prevalent phrasing for job skills, thus the likelihood of the résumé passing the filters of the résumé parsing software can be greatly increased. Algorithms and systems that improve the quality and relevance of skills incorporated into a resume that in turn improves the likelihood of a résumé passing a skills based filter in résumé parsing software is only one example technical advantage of incorporating recommended skills generated by processes described herein.

Generic content recommendations merely provide a list of skills that are limited to those statically associated with a specific job title or the user's most recent job title. Consequently, only skills directly corresponding to that particular job title are presented.

In contrast, systems and methods for generating skill recommendations that are depicted and described herein extract skills based on the collective usage patterns of existing resumes of individuals who share recent and similar experience levels, and possess job titles with semantic similarities. Additionally, one or more work history statements directed to skills from the user's work history are considered. In certain aspects, the multiple factors utilized for generating skill recommendations may include but are not limited to a current job title, an experience level corresponding to the current job title, and one or more work history statements, as well as skills from one or more dynamically generated and curated skills datasets. The multiple factors may be embedded into respective vectors using an artificial intelligence (AI) model including but not limited to one or more machine learning models, one or more natural language processing (NLP) models, or the like. The embeddings, for example the respective vectors, may be used to evaluate similarities between job titles, work history, work history statements, and skills to generate skill recommendations that are both highly relevant to a user and arranged in an ordered manner with the most relevant skills provided first in the ordered list.

This approach surpasses the constraints of relying solely on job titles, and thereby enables highly customized skill recommendations tailored to each user's unique situation and needs to be provided to the user. A number of the customized skill recommendations can then be manually or automatically selected and utilized to complete a document, such as a résumé, cover letter, a job application, or the like.

With current approaches, the sequence of skills is unordered, which complicates the automatic generation of content because a consistent set of automation logic for selecting one or more of the recommended skills cannot not be applied consistently from user to user. Instead, the selection and verification of relevant skills remains a manual task.

However, the systems and methods for generating skill recommendations depicted and described herein provide skills that are organized to prioritize those that are both highly relevant to the user's work history and optionally frequently used by other users having similar work histories. As described below, the top recommended skills in the ordered list include those that are recommended based on the current job title and experience level in conjunction with the work history of the user. The ordered list may continue with skills extracted from the one or more work history statements, which may be further followed by additional skills obtained from a query of skills based on only the current job title and corresponding experience level. This arrangement ensures that the user of the automated content generation process, such as an automated résumé builder application, first encounters the most pertinent skills at the top of the list.

The implementation of systems and methods for generating skill recommendations described herein provides contents that are not solely based on job titles, but takes into account a broader set of criteria. Aspects aim to significantly enhance the user experience. For example, users would receive skills content that aligns with their individual career journeys, making it more relevant and valuable. The implementation of advanced personalization in content generation can significantly enhance user engagement, content consumption, and overall satisfaction. Additionally, the wealth of data generated by user interactions with personalized content can be utilized to continually improve content recommendations, optimize content creation processes, and provide valuable insights for marketing and content development.

Certain aspects of the systems and methods for generating skill recommendations that are described herein not only improve a user's experience with tools for generating content for online forms such as a résumé, a cover letter, a job application, or the like, but also improve the operation of automated content building tools by generating ordered lists such that the automated content generation processes do not need to be adapted or tailored for specific users. For example, the automated content generation processes can be configured to make automatic selections of recommended skills for including in the online form for a user without implementing additional analysis processes to determine which skills are the most relevant to the user since the recommended skills are generated in an ordered list that reflects their relevance to the user.

Aspects of the systems and methods for generating skill recommendations that are described herein provide several technical improvements and advantages over current processes. As will be described in more detail herein, aspects provide skill recommendations that are personalized beyond those associated only with job titles by considering the collective patterns of users with similar experience levels and semantically similar job titles. For example, through a comprehensive skill extraction process, aspects combine insights from a user's work history with the collective wisdom of the user community. This skill extraction process yields a comprehensive list of skills that goes beyond job titles, encompassing the full spectrum of the user's professional capabilities and interests. The skill recommendations are not only generated based on multiple factors, but they are also provided in a sequenced skill presentation (e.g., referred to herein as an ordered list). For example, the most relevant skills, based on both the user's work history and the preferences of similar users are positioned at the top of the list. This strategic sequencing ensures that users and automated content building tools encounter the most pertinent skills first.

As described herein, aspects provide technical solutions to creating an electronic document such as a résumé, a cover letter, a job application, or the like that contains skills that are relevant to a user's work history, current job title, and experience level. Technical solutions for determining which skills are the relevant skills and subsequently generating recommended sills that can be automatically populated into an electronic document being created for a user. The document creation system and corresponding processes described herein provide specific technical processes for evaluating historical résumé for determining similar job titles and further determining relevant skills to recommend for including in the electronic document. For example, as discussed in more detail herein, the process of generating embeddings for high-dimensional objects such as work history statements, job titles, and skills, reduces the dimensionality of the objects so they may be processed with fewer computing resources and in less time compared to analysis of raw high-dimensional data.

Moreover, the document creation processes provide practical solutions to generating recommended skills for inclusion in an electronic document. These processes not only provide more relevant skills information for a user in an electronic document, the resulting electronic documents improve the likelihood of the résumé passing the filters of the résumé parsing software. Improving the likelihood of a résumé passing a skills based filter in résumé parsing software is only one example technical benefit of incorporating recommended skills generated by processes described herein. Other technical solutions and advantages are provided herein.

Example Document Creation System Including
Skill Recommendation Processes

FIG. 1 depicts an example document creation system 100 configured to perform skill recommendation processes that are depicted and described herein. The document creation system 100 may be configured to interface with one or more users (e.g., a first user 101 and second user 102) to generate a document, such as a résumé, cover letter, a job application, or the like. The document may be an electronic document, a component of an online profile, a printable document, or another type of document that a user may desire to create. The one or more users may include a job seeker, an employer, a reviewer, an administrator, or the like. The one or more users may interface with aspects of the document creation system 100, for example implemented by one or more computing devices 110, through a user device (e.g., a first user 101 with a first device 104 and a second user 102 with a second device 106).

For example, a first user 101 may be a user desiring to create a résumé for submitting with a job application. The first user 101 may interface with the document creation system 100 via a first device 104 such as a personal computer, a cellular telephone, a PDA, smart device, or the like. A second user 102 may be an administrator whose role is to collect and generate curated anonymized data 112 from a plurality of users for storing in one or more curated databases 114. For example, the administrator may define one or more rules regarding data that is to be collected and curated. The administrator may define a rule that only historical data from users having an engagement level greater than a predetermined level should be collected and curated. The engagement level may be defined to correspond to a completion percent of a résumé and the predetermined level may be set to 50%, 60%, 70%, 80%, 90%, or any value between 50% and 100%. Other rules may include that a historical user's data must have been downloaded at least once. Furthermore, there may be a period of time defining the range of historical data that is collected. For example, historical data may only include user information that was input into the system within the past 3 years or other defined period of time. A goal of establishing rules regarding the collection and curation of historical data is to provide a measure of quality and relevance to the data considered for the skills recommendation processes described herein.

The curated anonymized data 112 stored in the one or more curated databases 114 may include job data from a plurality of users. The job data may include attributes such as job titles, corresponding experience level(s) (e.g., years of experience corresponding to a current job, years of relevant experience), one or more skills corresponding to the current job, and other job and skill related attributes, such as historical job titles. FIG. 4 depicts an illustrative example of job data contained in the one or more curated databases 114. It is understood that the job data depicted in FIG. 4 is merely on example and that other examples of curated data may be stored in the one or more curated databases 114.

The first device 104 and/or the second device 106 may include a display device for implementing a user interface with the respective user, one or more processors for executing logic and one or more non-transitory computer-readable mediums for storing information and/or computer readable instructions. The first device 104 and/or the second device 106 may operate as an interface for interacting with processes of the document creation system 100 configured to perform skill recommendation as depicted and described herein. The processes of the document creation system 100 may be performed by one or more computing devices 110. The one or more computing devices 110 may include one or more processors and one or more non-transitory computer-readable mediums storing computer readable instructions that, when executed by the one or more processors, cause the computing device to perform processes defined by computer-readable instructions corresponding to one or more components depicted and described herein.

The one or more computing devices 110 may be configured to implement one or more AI models such as one or more machine learning models including, but not limited to, one or more large language models (LLMs). Examples of LLMs include, but are not limited to, OpenAI's ChatGPT, NeMO™ LLM from NVIDIA®, LLaMa from Meta®, BERT from Google®, CLAUDE™ from Anthropic A.I., and FLAN-T5 form Google®. Components of the processes described herein can implement one or more LLMs currently developed or that may be developed in the future. In certain aspects, the one or more AI models may include one or more NLP models, such as stsb-roberta-large, paraphrase-mpnet-base, gtr-t5-large or other sentence transformer models.

Example Document Creation Processes Including Skill Recommendation Processes

Figure 2:
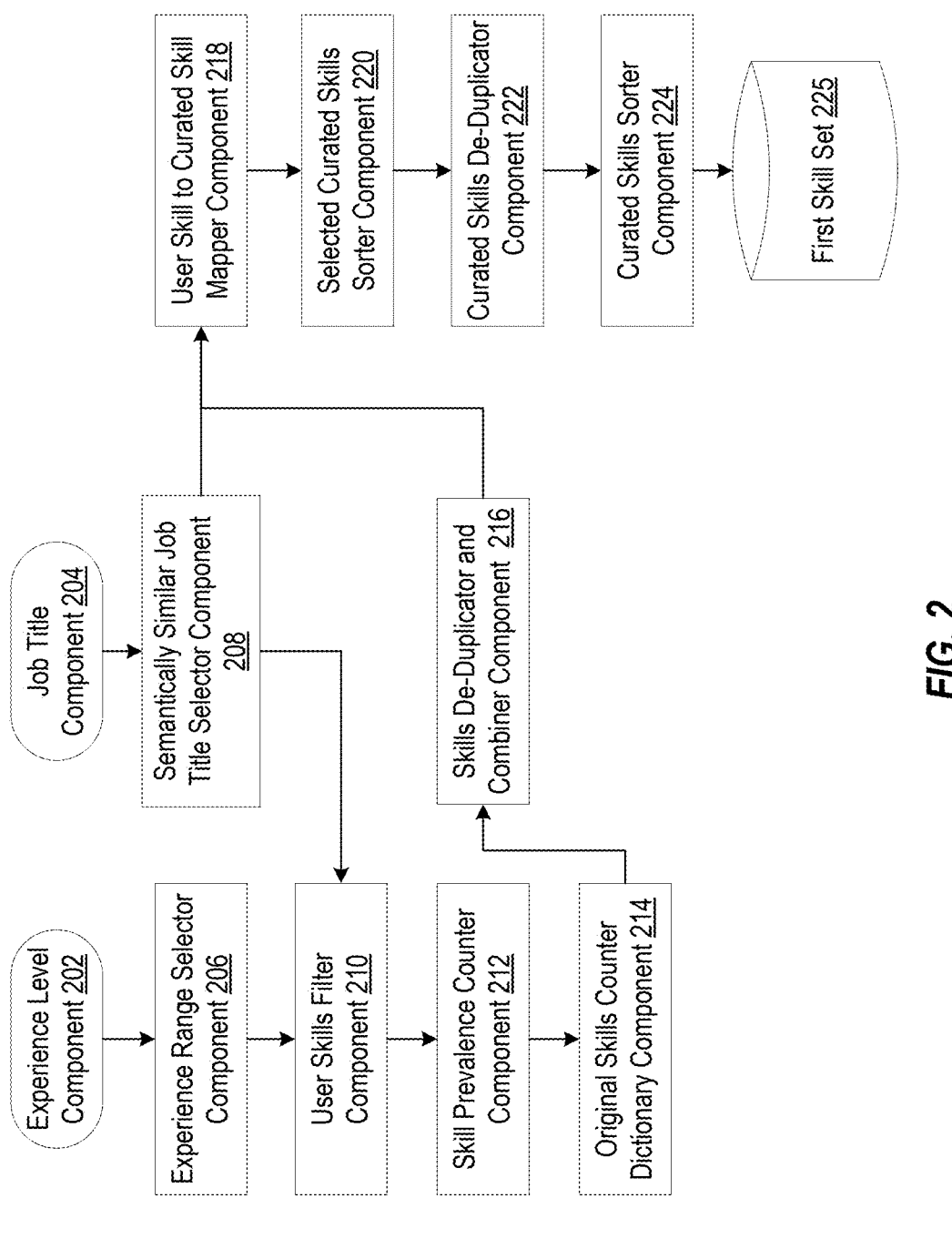
FIG. 2 depicts a process implemented by a document creation system for generating content recommendations based on a current job title and experience level, according to one or more embodiments shown and described herein.
Figure 3:
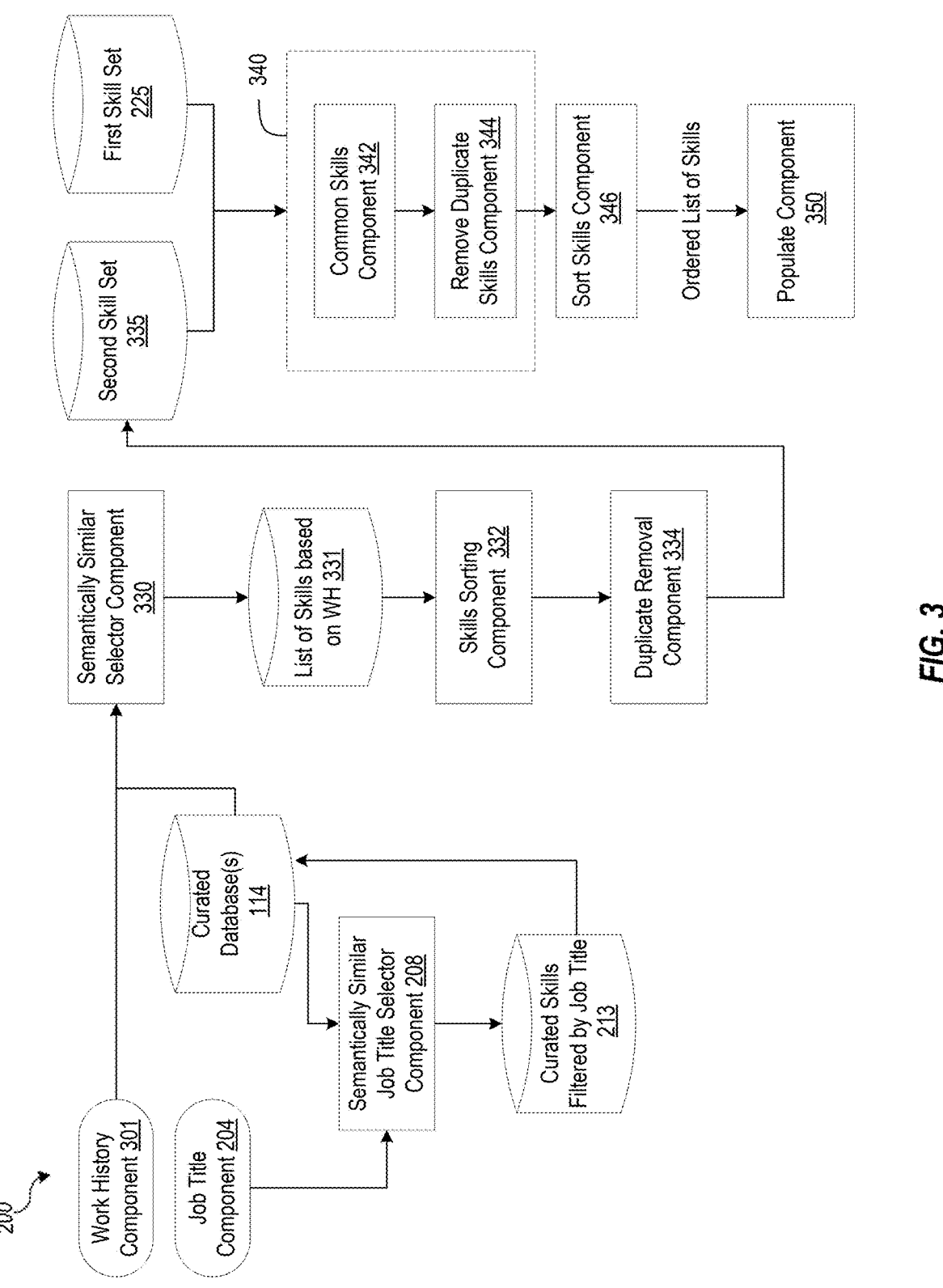
FIG. 3 depicts an extension of the process depicted in FIG. 2 implemented by the document creation system for generating additional content recommendations based on work history, according to one or more embodiments shown and described herein.

FIGS. 2 and 3 depict a document creation process 200 implemented by the document creation system 100 for generating skills recommendations based on a current job title and experience level. In particular, FIG. 2 depicts aspects of the document creation system 100 relating to the generation of skills based on job title and corresponding experience level. FIG. 3 depicts further aspects of the document creation process 200 implemented by the document creation system 100 relating to the generation of skills based on work history and merging the generated skills into a skills recommendation list, referred to herein as an ordered list.

The document creation system 100 may deploy a user interface to a user device (e.g., the first device 104 and/or the second device 106), examples of which are depicted and described with reference to FIGS. 5 and 6. A user (e.g., the first user 101 or the second user 102) may input a current job title and a corresponding experience level through the user device.

The document creation process 200 identifies similar job titles in a database of historical résumés. For example, the document creation process 200 may employ one or more analytic techniques such as clustering analysis, content analysis, text analysis, semantic analysis, or other methodologies to associate job titles with each other. Job titles may be associated with each other based on semantic similarities scores of the name(s) used to define a job title. For example, job titles that include similar terms such as "engineer," "scientist," "manager," "teacher" and the like, may grouped or linked together based on the use of a common job title term. Additionally, the one or more analytic techniques may extract additional information from historical résumés to further define job titles so that the additional information may be utilized to further score and/or group similar job titles. For example, résumés from a plurality of different users may provide descriptions of the skills, tasks, and tools they utilized in performing the same or a similar job. These insights obtained from these descriptions can be used to further refine groups of initially linked job titles as being similar. For example, job titles such as "electrical engineer," "electrical design engineer," "electrical engineering technician," and "electronics engineer" may be initially linked or grouped together based on the use of common terms used in the respective job title. Further analysis of the descriptions of the skills, tasks, and tools a plurality of users provided in their résumés may further delineate similarities between job titles. For example, descriptions corresponding to the job titles of "electrical engineer," "electrical design engineer," and "electronics engineer" may emphasize skills relating to solving problems, mathematical analysis skills, and developing research and development plans. However, the descriptions corresponding to the job title of a "electrical engineering technician" may emphasize different responsibilities, skills, and tools, such as operating test equipment, building prototypes, and collecting data. As such, through the one or more analytic techniques such as clustering analysis, content analysis, text analysis, semantic analysis, or other methodologies, textually similar job titles may be further delineated based on analysis of the descriptions provided for the jobs extracted from the database of historical résumés.

Based on the similar job titles, relevant job skills are extracted from a skills database, and displayed to the user. In order to determine relevant job skills, processes of counting the usage of particular skills associated with jobs determined to be similar, as previously discussed, for example, may be employed. The processes of counting may include determining the frequency of occurrences of a skill within the group of similar jobs. In certain aspects, a ratio of unique skills to the total number of skills for a job title may be determined. In the same or other aspects, a ratio of common skills within a group of jobs to the total number of skills expressed for each respective job may be determined. Job titles having a high ratio of common skills may indicate that those skills are more relevant to the group of similar job titles. Through processes described in more detail herein, those skills may be provided to a user as being relevant to include in their new résumé, job application, cover letter, or the like. The user can select skills to include in a new résumé. By providing the user with relevant job skills from the skills database, the user can be more confident that the skills terminology and description will be properly interpreted by résumé parsing software, and passed through parsing filters.

Aspects of the document creation process 200 generate a first set of skills matched against a list of job skills queried from a database of historical résumés based on multiple inputs (e.g., job title and experience level). The first set of skills are expressed in terms and phrasing that occur most often in résumé parsing software; thus, one effect of incorporating any of the first set of skills in a résumé can increase the chances that the résumé will pass the résumé parsing software. In addition to providing a first set of skills, certain aspects of the present disclosure also order the first set of skills based on the prevalence of similar job skill terms appearing in the historical résumés for the given inputs. As a result, the user can select curated job skills that most closely match the user's actual skills and are most prevalent in résumés from other applicants with a similar job title and experience level. Résumés created using aspects of the present disclosure use the most prevalent phrasing for job skills, thus the likelihood of the résumé passing the filters of the résumé parsing software can be greatly increased. Improving the likelihood of a résumé passing a skills based filter in résumé parsing software is only one example technical advantage of incorporating recommended skills generated by processes described herein.

Certain aspects of the document creation process 200 employ one or more computing devices 110 (FIG. 1) specially configured to perform processes, such as those described herein. For example, an aspect of the present disclosure utilizes one or more computing devices 110 and an AI model, such as a NLP model, to embed the job titles. AI models can be configured to embed a data object such as a job title, which is a highly-dimensional object. The job title may be highly-dimensional object because a job title can be defined by more than just the terms which express the name of the job title. For example, a job title may be associated with attributes such as skills, tools, responsibilities, experience level, location, education, and the like which makes the job title a highly-dimensional object. Embeddings can be used to represent high-dimensional data in a low-dimensional space. The process of generating an embedding may involve converting the high-dimensional object into complex mathematical representations that capture inherent properties and relationships between the attributes of the object. The process of generating an embedding can be automated, where AI systems self-create embeddings during training and using them as needed to complete new tasks such as predicting one or more similar job titles for a new job title object received as an input. Embeddings reduce the number of dimensions by identifying commonalities and patterns between various features. This consequently provides the technical benefit of reducing the computing resources and time required to process raw data.

In some aspects, the one or more computing devices 110 may implement a similarity determining function, such as a Cosine similarity function, and use the job title embeddings to identify semantically similar job titles. Moreover, various databases are constructed, and structured, to hold historical résumé data, and a first set of skills in a form that is readily retrievable and useable by aspects of the present disclosure.

The document creation process 200 depicted in FIG. 2 obtains a value for total years of experience with the experience level component 202 and a current job title with the job title component 204. The total years of experience is used by an experience range selector component 206 to select an appropriate experience range. For example, someone just entering the workforce with no experience may enter zero for total years of experience. In such a case, the experience range selector component 206 may select an experience range of 0-2 years. In another example, for someone with 20 years of experience, the experience range selector component 206 may select an experience range of 15-25 years.

While the obtained experience level (e.g., years of experience) can be used in certain aspects of the present disclosure, utilizing an experience range based on the experience level can provide some benefits. An experience range, when selected appropriately, can provide a broader, but still relevant, list of skills that a user can add to their résumé. For example, a cashier with 4 years of experience, may still perform job tasks that may be considered a job skill of a cashier with one year of experience. Conversely, a cashier with 2 years of experience, depending on the individual and employer, may be performing some of the tasks that normally a retail employee having 4 or 5 years of experience may perform, such as training new cashiers or performing some managerial tasks. Thus, by using an experience range there is a better chance of capturing and presenting to the user a full range of skills that may be appropriate for the experience level.

Moreover, in some embodiments the experience range selector component 206 may base the selection of experience range on, not just the total years of experience, but also on the current job title obtained by the job title component 204. For example, certain professions require significant on-the-job-training, thus someone with 5 years of experience may still be considered a novice, and thus the experience range selector component 206 may select an experience range of 0-7 years in this case. The experience ranges are intended for illustrative purposes only, and are not intended to provide limiting ranges. The experience ranges may be any ranges deemed appropriate based on the particular implementation of aspects of the present disclosure.

A semantically similar job title selector component 208 uses the current job title obtained by the job title component 204 to query, identify, and select semantically similar job titles from the one or more curated databases 114 (FIG. 1), which include a historical dataset of résumés. In certain aspects, the semantically similar job title selector component 208 may form a curated skills set filtered by job title. Various methodologies may be applied by the semantically similar job title selector component 208 to identify semantically similar job titles. For example certain embodiments of the present disclosure may implement a Cosine similarity function:

$$\text{Similarity Score } (S) = \cos(\emptyset) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}, \quad \text{(Eq. 1)}$$

where $A_i$ and $B_i$ are the ith component of n-dimensional vectors A and B, and $\theta$ represents the degree of similarity as an angle between vectors A and B, which represent vector embeddings of job titles. Alternatively, word2vec, GloVe, Google Similarity Distance, or other NLP methods may be used for determining semantic similarity.

The similarity score(S) may be calculated using the Cosine similarity between the encodings of two statements (e.g., the user-provided job title (A) and a job title from a plurality of job titles stored in the historical dataset of résumés (B)). The encodings, generally represented as n-dimensional vectors, may be generated using any appropriate natural language processing (NLP) model, such as stsb-roberta-large, paraphrase-mpnet-base, gtr-t5-large or other sentence transformer models. In certain aspects, the historical dataset of résumés may be implemented as a database in which each historical job title may be associated with an encoding generated by the NLP. In certain aspects, the database stores the dataset in a comma separated values (CVS) file.

The semantically similar job title selector component 208 may apply a similarity threshold (also referred to herein as a threshold score) for the similarity scores to determine which job titles are sufficiently similar to be selected. For example, the similarity threshold may be set at 0.75 (or 75%) similarity. Other similarity threshold values, such as 0.65, 0.70, 0.80, 0.85, 0.90, 0.95, or any other value between 0 and 1, may be used as deemed appropriate. However, a similarity threshold value that is too permissive may allow job titles that are not relevant, while an overly restrictive similarity threshold may exclude relevant job titles and thus limit the set of job skills presented to the user. Any job title equal to or above the similarity threshold is selected by the semantically similar job title selector component 208.

For example, identifying similar job titles to "Cashier" might yield a list of "Checkout Operator," "Cashier Clerk," "Cashier Attendant," "Point of Sale (POS) Operator," "Cash Handler," and "Store Cashier" for a similarity threshold set to 0.75. If the similarity threshold value is set to 0.9, the resulting list may be "Cashier Clerk," "Cashier Attendant," "Cash Handler," "Store Cashier" instead. However, with the threshold is set to 0.6, the list could add extra job titles not directly matching to "Cashier", such as "Retail Clerk," "Sales Associate," "Checkout Operator," ""Cashier Clerk," "Customer Service Representative," "Front End Associate," "Cashier Attendant," "Point of Sale (POS) Operator," "Cash Handler," "Store Cashier."

The experience range selector component 206 may further cause the historical dataset of résumés to be filtered based on the experience range selected to obtain filtered data based on experience. The job title selector component 208 may cause the obtained filtered data to be further filtered by the semantically similar job titles selected by the semantically similar job title selector component 208, thereby forming a curated skills set filtered by job title and experience level. To facilitate further filtering of the data in the historical dataset of résumés, the historical dataset may be implemented as a database that is delineated by fields, such as job title, skills, years of experience, and the like. Filtering such a database may be accomplished using database query languages (e.g., SQL, XQuery, GraphQL, and the like), for example. The resultant data, e.g., filtered data based on job title and experience, is further filtered by a user skills filter component 210 to extract a list of skills corresponding to the semantically similar job titles and the selected experience range.

For example, the user skills filter component 210 may extract skills associated with the semantically similar job titles from the historical dataset in a similar manner to the above described processes corresponding to filtering the historical dataset based on job title and experience level. Alternatively, a separate database of the one or more curated databases comprising skills corresponding to job titles and experience levels may be queried and filtered by the user skills filter component 210 to form a skills list. The one or more curated databases comprising skills may have predefined job titles associated with one or more skills. Thus, the user skills filter component 210 may select skills that are associated with semantically similar job titles from the curated databases. Other filtering techniques may be employed as appropriate without deviating from aspects of the present disclosure. For example, other filtering techniques such as statistical filtering that applies statistical methods, such as Term Frequency-Inverse Document Frequency (TF-IDF), Association Rule Mining, Chi-square test, or the like, may be implemented to identify skills that frequently co-occur with specific job titles or experience levels in the historical dataset. In certain aspects, other filtering techniques may include training and implementing a machine learning classification model configured to classify job titles or experience levels and predict associated skills.

A skill prevalence counter component 212 tracks prevalence (e.g., occurrence) of each skill within the historical dataset. An original skills counter dictionary component 214 is generated based on the skill prevalence counter component 212. The original skills counter dictionary component 214 provides a listing of all the skills extracted by the user skills filter component 210 along with their associated prevalence count generated by the skill prevalence counter component 212.

For example, if a user specifies "Cashier" as their current job title, the corresponding original skills counter dictionary component 214 is established to consolidate skills prevalent among other users with the same job title in their résumés. The original skills counter dictionary component 214 might take the form: {Deposit Verification: 10, Wire Transfers: 9, Stocking And Replenishing: 7, Merchandising: 5}. In this example representation, the counts (e.g., 10, 9, 7, and 5) signify the frequency of each skill, indicating that "Deposit Verification" is employed by 10 users, "Wire Transfers" by 9 users, and so on.

Moreover, the semantically similar job titles may be used to filter a database of curated skills organized by job title to obtain curated skills filtered by the current job title obtained by the job title component 204. The database of curated skills is a database containing skills generated and maintained by a content creation system implementing aspects of the present disclosure. Filtering the database of curated skills may be accomplished using database query languages (e.g., SQL, XQuery, GraphQL, and the like), for example. In certain aspects, the content creation system may be a résumé creation service. The historical dataset of résumés, in contrast may be a database of actual user résumés that has been created or uploaded to the résumé creation service and thus represent a real world relationship between job titles, experience level and job skills.

A skills de-duplicator and combiner component 216 may be implemented to parse the original skills dictionary to identify duplicate skills and combine the duplicates into a unique entry. The skills de-duplicator and combiner component 216 may further perform a summation of the prevalence counts of the duplicate skills and update the prevalence count for the unique entry of the skill. The de-duplicated and combined user skills form a unique user skills dataset.

A user skill to curated skill mapper component 218 may be implemented in the document creation process 200 to map the skills of the unique user skills dataset to the curated skills filtered by the semantically similar job titles to generate a selected curated skills dataset. The user skill to curated skill mapper component 218 may employ various mapping techniques to map the user skills to the curated skills. For example text matching, natural language processing (NLP), semantic similarity, rulesets, fuzzy logic, or other appropriate text mapping technique. The curated skills dataset includes prevalence counts associated with the mapped user skills. A selected curated skills sorter component 220 sorts the selected curated skills into a hierarchy based on the associated prevalence count of each curated skill.

A curated skills de-duplicator and combiner component 222 may parse the sorted curated skills to identify duplicate skills and combine the duplicates into a unique entry. The curated skills de-duplicator and combiner component 222 may further perform a summation of the prevalence counts of the duplicate skills and updates the prevalence count for the unique entry of the curated skill. The de-duplicated and combined curated skills form a unique curated skills dataset. A curated skills sorter component 224 may sort the unique curated skills dataset based on the prevalence count and outputs a first skill set 225 that may be sorted based on the prevalence count. As previously described, the first skill set 225 may be a list of skills formed based on the current job title and the experience level of the user.

In certain aspects, the first skill set 225 may be transmitted to a user device, such as the first device 104 or the second device 106 shown in FIG. 1, and displayed as a selectable list that a user can use to populate section of an electronic document. However, in other aspects, the first skill set 225 is merged with a second skill set generated based on one or more work history statements as depicted and described for example with reference to the components shown in FIG. 3.

FIG. 3 depicts further aspects of document creation process 200 implemented by the document creation system 100 relating to the generation of skills based on work history and merging the generated skills into a skills recommendation list.

The process of generating an ordered list of recommended skills based on work history may begin with the work history component 301 obtaining one or more work history statements from a user or a user's profile containing one or more work history documents, such as a previously prepared résumé. The one or more work history statements describe activities related to previously held jobs. As such, the one or more work history statements may recite or allude to one or more skills from prior work experience. For example, a description of a previously held job by a user may have include a work history statement such as "managed a team of 5 employees" or "negotiated contracts for research and development ventures." These are just two examples.

There may be instances where a user does not provide one or more work history statements corresponding to past work history. In such instances, the document creation process 200 may compare the user's current job title and experience level to other users and determine a probable work history or education history that may apply to the user for purposes of generating skill recommendations based on work history. In some instances, a new user may not have any industry-level experience to provide as past work history. In such instances, aspects of the document creation process 200 may select the skills based on the other previous users' information that corresponds to the job title the new user may be targeting. For example, a new user may utilize the document creation process 200 to generate skills for a software developer position. Since the new user does not have any industry-level experience, for example, in software development positions because they may be a recent college graduate, they would not be able to provide any work history content. However, since the document creation system 100 implementing the document creation process 200 has analyzed skills from previous users who applied for software developer positions, it has learned that skills like "Java programming," "Python scripting," "SQL database management," and "Agile software development" are commonly sought after for this role based on the job descriptions and user profiles. Accordingly, aspects of the document creation system 100 may suggest these skills to the new user.

By leveraging work history statements in the process of generating skill recommendations for including in an electronic document, such as a résumé or job application, an even broader set of criteria than just the current job title and experience level can be utilized to increase the relevancy and value of content for a user. For example, the work history statements may provide enlightening insights into skills that the user may have obtained throughout their career(s), which may not be front of mind as it is not a direct skill implemented by a current job, but which are still very relevant as they may have mastered the skills during a previously held job. Additionally, leveraging work history statements may further enable work history of a user to be compared with similarly situated users. The similarly situated users may identify one or more additional, new skills that the user has not considered relevant to a past job. Accordingly, these new skills may be included as skills the in the electronic document created by the document creation system described herein to improve the likelihood that the user's electronic document, such as a résumé passes automated résumé parsing systems.

The process of generating recommended skills based on work history may be interconnected with components of generating skill based on the current job title and experience level. For example, the process of generating recommended skills may obtain a curated skills set 213 filtered by job title from the semantically similar job title selector component 208. As an example, the job title "Data Scientist" may be linked with skills such as Python programming, R programming, machine learning, statistics, data analysis, SQL, data visualization, big data technologies, problem-solving abilities, and strong communication skills. Each job title may be paired with a list of relevant skills that are commonly expected or desired for that particular role. The job title and relevant skills pairing may be generated using model-based clustering techniques, for example, but not limited to a multivariate Gaussian mixture model, where, for example, each job title from other users' electronic documents and the associated skills forms a multivariate Gaussian distribution. The model is trained to observe and determine clusters of skills and job title correspondences.

A semantically similar selector component 330 may receive the one or more work history statements from the work history component 301 and further communicatively couple to one or more curated databases (e.g., 114 of FIG. 1) to access skills databases and the curated skills set 213 filtered by job title from the semantically similar job title selector component 208. For example, someone with the job title of "cook" may have one or more work history statements that include statements such as "cooked all menu items according to specified instructions;" practiced proper safety and sanitation standards;" and "identified inefficiencies leading to improved productivity."

The semantically similar selector component 330, which may implement similar technology as the semantically similar job title selector component 208, may include processes for generating a list of skills 331 based on the one or more work history statements. The semantically similar selector component 330 may determine a list of skills 331 for each of the one or more work history statements in turn. For example, a first iteration may process the work history statement of "cooked all menu items according to specified instructions." A subsequent iteration may then process the next work history statement and so on and so forth until a list of skills 331 is generated for each of the one or more work history statements.

Following the "cook" example, the semantically similar selector component 330 may generate a list of skills 331 that includes, for example, before duplicates are removed, "cooking technique demonstrations" with a semantic similarity score of 0.721; "menu item memorization" with a score of 0.713, "cooking method accuracy" with a score of 0.708, "menu explanation" with a score of 0.694, "prepared foods plating" with a score of 0.684, "food portion specification" with a score of 0.68, "food preparation and plating" with a score of 0.677, "preparing specialty food" with a score of 0.673, "special menu plating" with a score of 0.664, and "menu planning" with a score of 0.661. In certain aspects, the semantically similar selector component 330 generates work history embeddings for each of the one or more work history statements. The work history embeddings may be generated using one or more AI models, such as a NLP model. In certain aspects, work history embeddings may be generated using ROBERTa, however, other AI models, such as other transformer-based models may also be used to capture semantic information which provide richer contextual embeddings compared to traditional word embeddings like Word2Vec or GloVe. That is, the work history embeddings consider the context of each word in a sentence, leading to more nuanced representations. Furthermore, as discussed in detail herein, a Cosine similarity may be used to assess the quality of the embeddings, which can ensure that they effectively capture the semantic similarities and differences between different pieces of text. The NLP model may include stsb-roberta-large, paraphrase-mpnet-base, gtr-t5-large, or other sentence transformer models. In instances where the skills stored in the one or more curated databases are not already embedded as skills embeddings, the semantically similar selector component 330 may use similar AI models to generate skills embeddings for skills stored in the one or more curated databases. In some embodiments, the semantically similar selector component 330 may initially or only work with the curated skills set 213 filtered by job title from the semantically similar job title selector component 208, thereby narrowing the field of potential skills to related job titles.

The semantically similar selector component 330, using the work history embeddings and the skill embeddings, determines a similarity score for pairs of work history embeddings and skill embeddings. The similarity score may be determined using a variety of methodologies, for example, but not limited to Jaccard similarity or Cosine similarity.

A Jaccard similarity score can be defined as an intersection of two documents (e.g., one or more work history statements in a first document and one or more skills in a second document) divided by the union of those two documents that refer to the number of common words over a total number of words. The Jaccard similarity score is in a range of 0 to 1. If the two documents are identical, Jaccard similarity is 1. The Jaccard similarity score is 0 if there are no common words between the two documents. The mathematical representation of the Jaccard Similarity is:

$$J(doc_1, doc_2) = \frac{doc_1 \cap doc_2}{doc_1 \cup doc_2}$$

As another example, the semantically similar selector component 330 may implement a Cosine similarity function:

$$\text{Similarity Score } (S) = \cos(\emptyset) = \frac{A \cdot B}{\|A\|\|B\|} = \frac{\sum_{i=1}^{n} A_i B_i}{\sqrt{\sum_{i=1}^{n} A_i^2} \sqrt{\sum_{i=1}^{n} B_i^2}}, \quad \text{(Eq. 1)}$$

where $A_i$ and $B_i$ are the ith component of n-dimensional vectors A and B, and 0 represents the degree of similarity as an angle between vectors A and B, which represent vector embeddings of work history and skills. Alternatively, word2vec, GloVe, Google Similarity Distance, or other natural language processing (NLP) methods may be used for determining semantic similarity.

The similarity score(S) may be calculated using the Cosine similarity between the embeddings of two statements (e.g., the work history embeddings (A) and the skills embeddings (B)). The embeddings, generally represented as n-dimensional vectors, may be generated using any appropriate natural language processing (NLP) model, such as stsb-roberta-large, paraphrase-mpnet-base, gtr-t5-large or other sentence transformer models.

The semantically similar selector component 330 further includes processes for selecting one or more second skills, from the one or more curated skills datasets, which correspond to the skill embeddings where the similarity score is greater than a predefined threshold to form the list of skills 331 based on the one or more work history statements.

The semantically similar selector component 330 may apply a predefined threshold for the similarity scores to determine which skills are sufficiently similar to those expressed in the one or more work history statements. For example, the predefined threshold may be set to a value between 0.5 (e.g., 50% similarity) and 1.0 (e.g., 100% similarity). Other predefined threshold values, including but not limited to 0.5, 0.55, 0.6, 0.65, 0.70, 0.75, 0.80, 0.85, 0.90, 0.95, 0.98, 0.99, or any other value between 0.5 and 1.0, may be used. However, a predefined threshold value that is too permissive may allow selection of skills that are not relevant, while an overly restrictive similarity threshold (e.g., a value of 0.98, 0.99, or 1.0) may exclude relevant skills and thus limit the set of job skills presented to the user.

In certain aspects, the list of skills 331 based on the one or more work history statements generated by the semantically similar selector component 330 may directly become the second skill set 335, which is subsequently merged with the first skill set 225 as described in more detail herein. However, in some aspects, the process of generating of skills based on work history may further include a skills sorting component 332 and/or a duplicate removal component 334 for refining the list of skills 331 based on the one or more work history statements.

The skills sorting component 332 may include one or more processes that order the skills in the list of skills 331 based on the value of the similarity score determined by the semantically similar selector component 330. For example, the skills sorting component 332 may be configured to order the skills in a high-to-low order where the skills are listed in descending order based on the value of the similarity score.

The duplicate removal component 334 may include one or more processes that identifies skills in the list of skills 331 that are repeated. Repetition of skills may occur because there is not a one-to-one relationship between job titles and skills. There may be multiple skills for one job title or multiple job titles that correspond to the same skills. As such, when analyzing work history statements, as discussed herein, there may be a number of skills that are obtained as being similar to the work history statements but arise because they corresponded to one or more different past job titles. For example, following the "cook" job title example, the duplicate removal component 334 may process the list of skills 331 and remove duplicates such that the list of skills after duplicate are removed includes, for example, "cooking technique demonstrations" with a semantic similarity score of 0.721; "menu item memorization" with a score of 0.713, "cooking method accuracy" with a score of 0.708, "menu explanation" with a score of 0.694, and "prepared foods plating" with a score of 0.684. That is, the skills of "food portion specification" with a score of 0.68, "food preparation and plating" with a score of 0.677, "preparing specialty food" with a score of 0.673, "special menu plating" with a score of 0.664, and "menu planning" with a score of 0.661 were determined to be duplicative of at least one of the aforementioned skills and since they had a lower similarly score, those skills were filtered out as the duplicates.

The document creation process 200 proceeds with processes for merging the generated skills (e.g., the first skill set 225 and the second skill set 335) into an ordered list comprising recommended skills for populating one or more sections of an electronic document by selecting at least one skill from the ordered list.

The merge component 340 may include one or more components for merging the generated skills into a skills recommendation. In certain aspects, a common skills component 342 compares the skills found in the first skill set 225 and the second skill set 335 to identify common skills. The common skills component 342 may implement one or more various similarity matching processes or AI models to identify skills that are identical or determined to be sufficiently similar that they are essentially duplicative. For example, one or more of the similarity scoring methodologies described herein may be utilize to make the determination as to which skills are common between the first skill set 225 and the second skill set 335. In certain aspects, the common skills component 342 may associate a flag or other indication with the common skills so that the sort skills component 346 may have an indication as to which skills should be listed first in the ordered list. Additionally, in some aspects, a further indication may be associated with each of the skills as to whether the skills arose from the first skill set 225 and the second skill set 335 since this may not be possible to decipher once the first skill set 225 and the second skill set 335 are merged.

A remove duplicate skills component 344 may receive indications from the common skills component 342 as to which pairs or groups of skills are identical or determined to be sufficiently similar that they are essentially duplicative. The remove duplicate skills component 344 implements one or more processes that delete or remove all but one of the skills from the indicated pairs of groups of skills. In certain aspects, the remove duplicate skills component 344 may further determine which skills in the indicated pairs of groups of skills arose from the first skill set 225 and cause those instances of skills to be deleted so that skills are not duplicated in the recommended skills list. Accordingly, the skills corresponding to the second skill set 335 are preserved in the merged set of skills. In this example, skills provided in the second skill set 335 are provided with more weight or relevance than those skills provided in the first skill set 225. However, should there be a reason to provide more weight or relevance to skills provided in the first skill set 225, then the remove duplicate skills component 344 may further determine which ones of the skills in the indicated pairs of groups of skills arose from the second skill set 335 and cause those instances of skills to be deleted.

The merge component 340 may then merge the skills remaining in the first skill set 225 and the second skill set 335 after processing by the common skills component 342 and/or the remove duplicate skills component 344 into a merged skill set.

A sort skills component 346 may receive the merged skill set and proceed with sorting the merged skill set into an ordered list. In certain aspects, the sort skills component 346 may sort a first skill set 225 based on a frequency of skills used by the previous employers along with a semantic similarity score. Accordingly, the first sorting process is based on the frequency score and for skills of the first skill set 225 that have the same frequency score, those skills are sorted based on semantic similarity score. In certain aspects, the sort skills component 346 may sort a second skill set 335 based on the semantic similarity score only. The sorting process positions skills that were indicated as being common between the first skill set 225 and the second skill set 335 as determined by the common skills component 342 in a first or top section of the ordered list. The remaining skills from the second skill set are populated into a second or middle section of the ordered list, while the remaining skills from the first skill set are populated into a third or bottom section of the ordered list.

Alternatively, the sort skills component 346 may position skills that were indicated as being common between the first skill set 225 and the second skill set 335 as determined by the common skills component 342 in a first or top section of the ordered list. Then, the sort skills component 346 may populate a second or middle section of the ordered list with the remaining skills from the first skill set, then populate a third or bottom section of the ordered list with the remaining skills from the second skill set.

The sort ordering may be adjusted from time to time, for example, when it is determined that skills based on a current job title and experience level may be more or less relevant to a user than skills based on their one or more work history statements. However, the merging of skills determined by two different querying processes (e.g., generation of the first skill set 225 as depicted and described with reference to FIG. 2 and generation of the second skill set 335 as depicted and described with reference to FIG. 3) enables common skills to be identified that likely have the most relevance and value to include in an electronic document such as a résumé, job application, cover letter, or the like.

In certain aspects, the document creation process 200 includes a populate component 350. The populate component 350 selects one or more skills starting from the top of the ordered list working down the list to include in one or more section of the electronic document a user desires to create with the document creation process 200. The selection process may be an automated process the prepopulates the one or more sections of the electronic document. The user may have the option to manually refine the populated sections by manually selecting to add or replace skills in the one or more section of the electronic document based on the ordered list being presented to them, for example, through a display of the user device.

Example Curated Data

FIG. 4 depicts an illustrative example of curated job-skill data 400. This is merely an example of a data structure that may be implemented for curating job titles with corresponding skills. The example is provided for context with regards to how data may be stored in the one or more curated databases 114 and the attributes associated with the data that can be queried by the one or more components of the document creation process 200 described herein.

For example, the curated job-skill data depicted in FIG. 4 is a snippet of job-skill data for user identified by the anonymized USERID "ASDF123." The user has two job titles, "dog walker" and "pet sitter" with a total experience of 3 years, which is broken into 0.5 relevant years as a "dog walker" and 2.5 relevant years as a "pet sitter." The experience level discussed herein refers to the relevant years of experience, or in other words the years of experience corresponding to a specific job title. The user created or entered data for the difference jobs in years spanning from 2019 (entry 0) through 2022 (entries 1-4). As discussed herein, in some aspects there may be a desire to restrict historical data to a certain date range. The creation date may be a date that can be used in those filtering processes. Other dates that can be used, which are not shown here, are the date in which a job was started and ended. It is further noted that some job titles, such as "pet sitter" in the present example, include multiple skills that are associated therewith. In such instances, the curated data may be captured across multiple entries that are unique to skills and job combinations for each user. As noted herein, this is merely one example of curated job-skill data 400, various other methodologies for formatting job-skill data for users may be implemented for the document creation process 200 described herein.

Example User Interfaces

Figure 5:
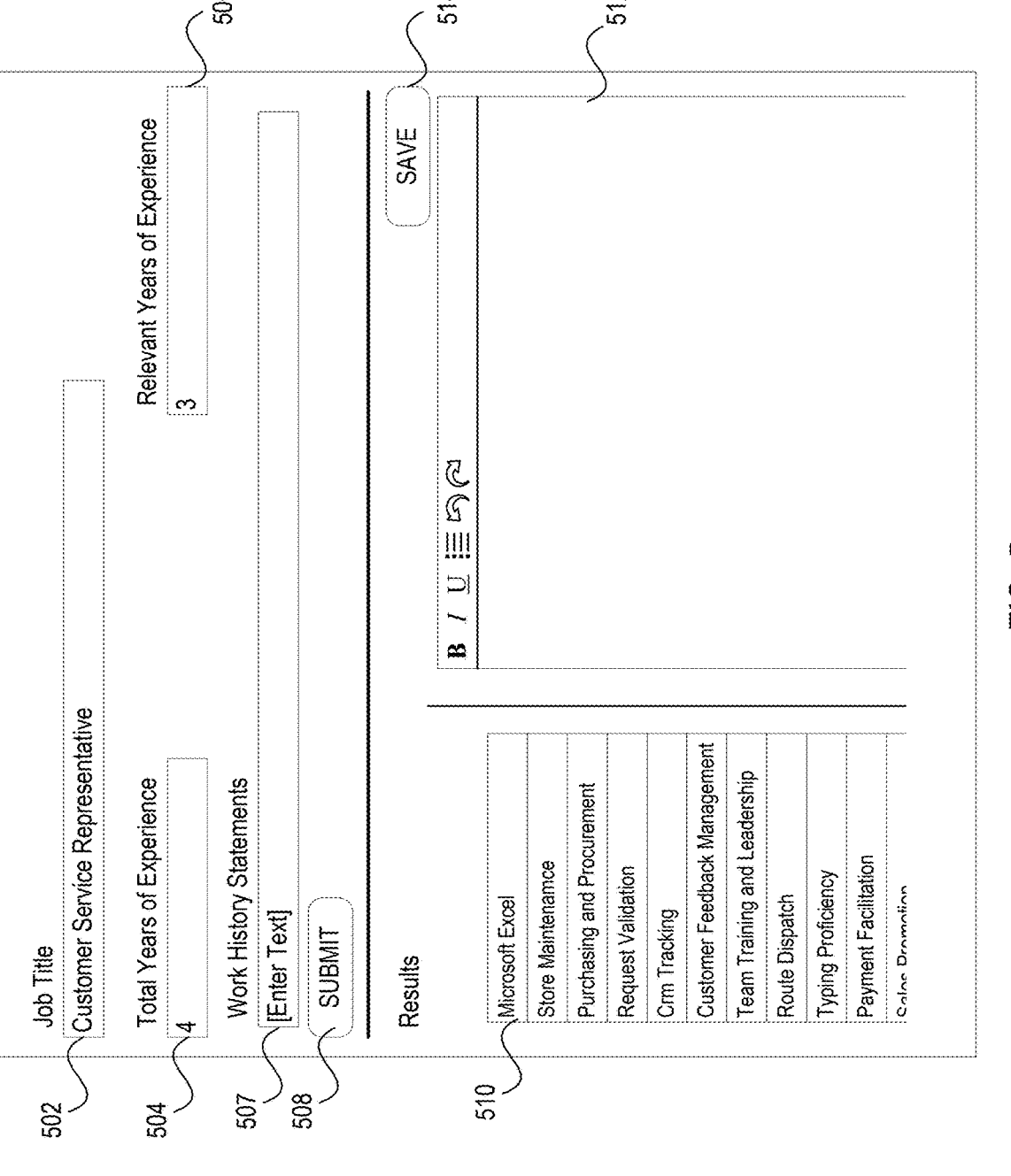
FIG. 5 depicts an example user interface for generating an online form, according to one or more embodiments shown and described herein.

FIG. 5 depicts an example user interface (UI) 500 provided by a document creation system 100 shown in FIG. 1 implementing aspects of the present disclosure. The UI 500 shown in FIG. 5 is a graphical user interface (GUI), however in the context of the present disclosure, it is understood that the UI 500 is not limited to a GUI, but rather may be implemented in other forms, such as spoken prompts, for example, which may be advantageous for users that are visually impaired. For brevity, the present disclosure will focus on a GUI version of the UI 500.

The UI 500 includes a plurality of interactive elements, such as text input fields, drop-down menus, text edit fields, buttons, and the like. In particular, UI 500, in certain embodiments, presents a job title field 502 configured to receive a job title from a user. A second text input field may be presented as a total years of experience field 504. In certain embodiments, another text input field may be presented as a relevant years of experience field 506. In other embodiments, relevant years of experience field 506 is present on the UI 500, but not the total years of experience field 504. Total years of experience may signify the total working years of the individual, while relevant years of experience may be limited to the number of years the individual has held the job title entered in the job title field 502. In certain embodiments, the total years of experience field 504 and the relevant years of experience field 506 may be configured to receive only numerical entries while the job title field 502 may be configured to receive any string characters. Other embodiments, may include additional text input fields 507, such as one or more of the following: work history statements, highest degree completed, degree major, previous job title, recent graduate, career changer, employment gap, employer, industry, occupation, and the like, along with content selections by other users with similar interests.

A submit button 508 may be provided that, when actuated by the user, causes underlying instruction code to transmit text entered in the job title field 502, total years of experience field 504, relevant years of experience field 506 and/or text input fields 507 to a processing system, such as the one or more computing devices 110 of the document creation system 100 shown in FIG. 1. The actions performed by the document creation system 100 are described in detail herein.

The UI 500 may receive, for example, from the document creation system 100, a set of results, namely an ordered list of relevant job skills, generated based on the information entered in the job title field 502, total years of experience field 504 and/or relevant years of experience field 506, as well as information entered in any other text input fields 507. The list of job skills may be displayed in a text list box 510. Additionally, user selection of a job skill from the list of job skills displayed in the text list box 510, in some embodiments, causes a skill description of the selected job skill to be displayed in text edit region 512. The skill description may include tasks, for example, that utilized the selected job skill. Within the text edit region 512, the user is provided with the functionality to edit the text of the skill description to better reflect the user's actual skills and experience. Selected job skills, along with any edits made by the user may be saved to a database by actuating a "Save" button 514.

In some embodiments, the saved job skills are associated in the database with the job title provided in the job title field 502. Subsequent to a user selecting and saving job skills, the document creation system 100 may be instructed by the user through additional UI screens (not shown) to generate a résumé incorporating the job title entered in the job title field 502 along with the associated job skills.

Figure 6:
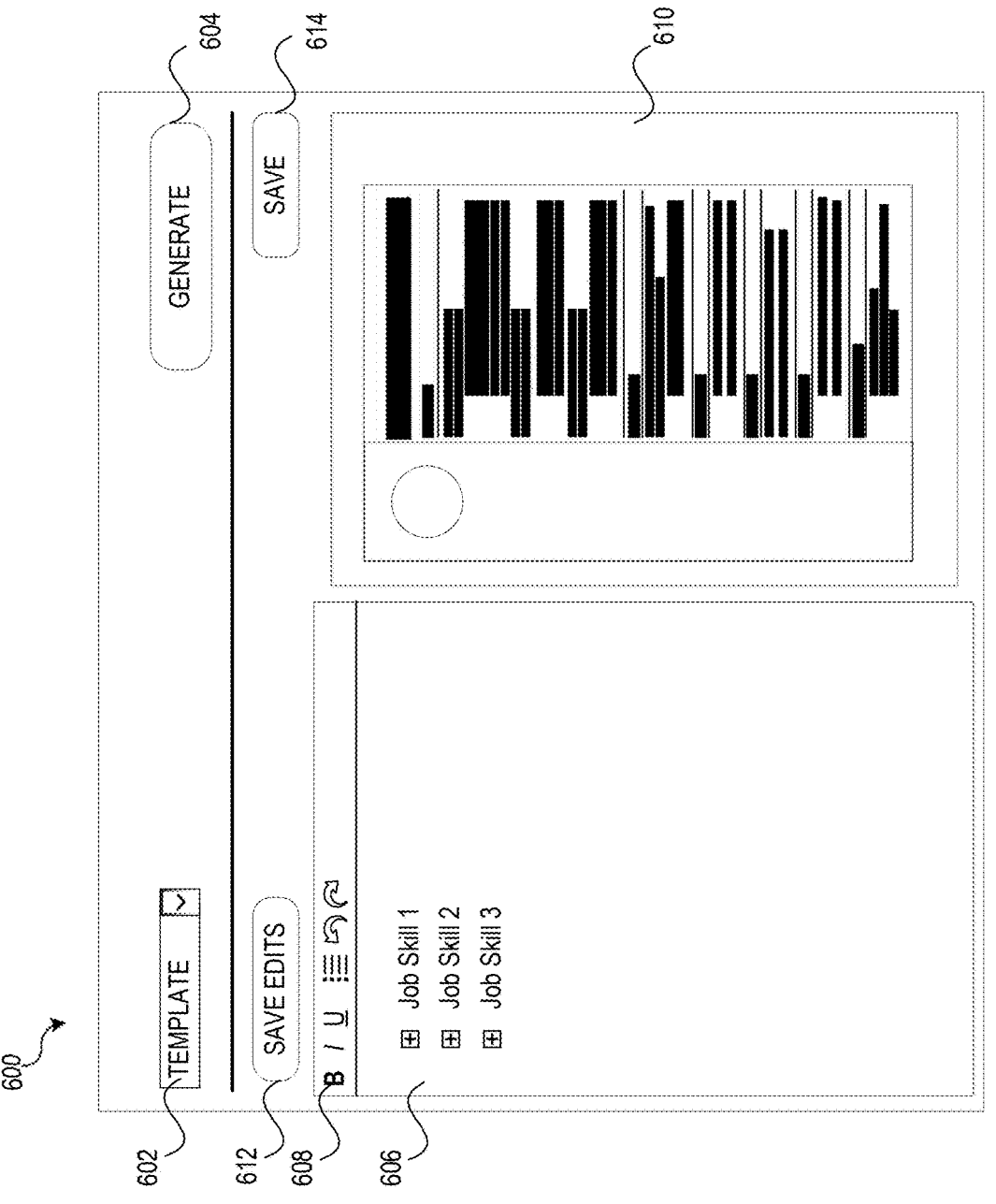
FIG. 6 depicts another example user interface for generating a form such as a résumé, according to one or more embodiments shown and described herein.

FIG. 6 depicts another example user interface (UI) 600 provided by a document creation system 100 shown in FIG. 1 implementing aspects of the present disclosure. For example, recommended skills may be presented in an ordered list as generated by the processes described herein to the user as shown in the UI 600. A draft electronic document shown in preview pane 610 may be automatically populated with skills generated by the processes described herein. UI 600 may provide the user with the opportunity to further edit the draft electronic document. For example, the user may change the document type by selecting a template through an interactive element, such as a drop-down list box 602 and subsequently causing the selected template document to be generated by selecting button 604. The document template selected may be a résumé, job application, cover letter, or the like. For example, the résumé content is output to an output element, such as preview pane 610. Content may be edited through the text edit box 606, which may include selectable items such as skills from an ordered list of skills.

The text edit box 606 may provide text editing tools 608, allowing the user to modify the text, add additional information, such as employment dates and the like, and rearrange the content. Additionally, the UI 600 may provide a preview pane 610 in which the résumé content shown in the text edit box 606 is displayed with the selected template applied thereto. Edits made to the résumé content in the text edit box 606 may, in certain embodiments, be reflected in the preview pane 610. A save edits button 612 is configured to save changes made to the résumé content shown in the text edit box 606, and a second save button 614 is configured to save the résumé with the applied template shown in preview pane 610 as a résumé document. The résumé document may be saved in any appropriate document format, such as PDF, DOCX, ODF, SVG, JPEG, and the like.

Example Method for Generating a Document with Recommended Skills

FIG. 7 depicts a flowchart of a method for providing job skill recommendations for an electronic document.

In this example, method 700 begins at step 705 with obtaining, for a first user, one or more work history statements, a current job title, and an experience level corresponding to the current job title, wherein the one or more work history statements comprises one or more job skills from prior work experience. For example, step 705 may be performed by the one or more computing devices 110 described above with reference to FIG. 1 configured to implement components including, but not limited to, the experience level component 202, the job title component 204, and the work history component 301 depicted and described with reference to FIGS. 2-3.

Method 700 proceeds to step 710 with querying one or more curated skills datasets to return a first skill set comprising one or more first skills associated with the current job title and the experience level. In some aspects the process of querying captured by step 710 may be performed by the one or more computing devices 110 described above with reference to FIG. 1 configured to implement components including one or more of the following: the experience range selector component 206, the semantically similar job title selector component 208, the user skills filter component 210, the skill prevalence counter component 212, the original skills counter dictionary component 214, the skills de-duplicator and combiner component 216, the user skill to curated skill mapper component 218, the selected curated skills sorter component 220, the curated skills de-duplicator and combiner component 222, and/or the curated skills sorter component 224 as depicted and described with reference to FIG. 2.

Method 700 proceeds to step 715 with generating, with an artificial intelligence model, work history embeddings based on the one or more work history statements. For example, step 715 may be performed by the one or more computing devices 110 described above with reference to FIG. 1 configured to implement components including, but not limited to, the semantically similar selector component 330 depicted and described with reference to FIG. 3.

Method 700 proceeds to step 720 with generating, with the artificial intelligence model, skill embeddings based on the one or more curated skills datasets. For example, step 720 may be performed by the one or more computing devices 110 described above with reference to FIG. 1 configured to implement components including, but not limited to, the semantically similar selector component 330 depicted and described with reference to FIG. 3.

Method 700 proceeds to step 725 with determining a similarity score between the work history embeddings and the skill embeddings. For example, the similarity score may be determined by one of the methodologies described with reference to the semantically similar selector component 330 depicted and described with reference to FIG. 3. For example, the similarly score may be determined using a Cosine similarity, a Jaccard similarity or another methodology.

Method 700 proceeds to step 730 with selecting, for a second skill set, one or more second job skills, from the one or more curated skills datasets, which correspond to the skill embeddings where the similarity score is greater than a predefined threshold. For example, step 730 may be performed by the one or more computing devices 110 described above with reference to FIG. 1 configured to implement components including one or more of the following: the semantically similar selector component 330, the skills sorting component 332, and/or the duplicate removal component 334 depicted and described with reference to FIG. 3 to form the second skill set 335.

Method 700 proceeds to step 735 with identifying, with a common skills component, one or more common skills between the first skill set and the second skill set. For example, step 735 may be performed by the one or more computing devices 110 described above with reference to FIG. 1 configured to implement components including, but not limited to, the common skills component 342, which is part of the merge component 340 depicted and described with reference to FIG. 3.

Method 700 proceeds to step 740 with merging the first skill set and the second skill set to form a merged skill set. For example, step 740 may be performed by the one or more computing devices 110 described above with reference to FIG. 1 configured to implement components including, but not limited to, the merge component 340 depicted and described with reference to FIG. 3.

Method 700 proceeds to step 745 with sorting the merged skill set into an ordered list whereby the one or more common skills are listed first in the ordered list, the one or more second skills are listed second, and the one or more first skills are listed third. For example, step 745 may be performed by the one or more computing devices 110 described above with reference to FIG. 1 configured to implement components including, but not limited to, the sort skills component 346 depicted and described with reference to FIG. 3.

Method 700 proceeds to step 750 with populating one or more sections of the electronic document by selecting at least one skill from the ordered list. For example, step 750 may be performed by the one or more computing devices 110 described above with reference to FIG. 1 configured to implement components including, but not limited to, the populate component 350 depicted and described with reference to FIG. 3. Résumés created using aspects as discussed use the most prevalent phrasing for job skills, thus the likelihood of the résumé passing the filters of the résumé parsing software can be greatly increased. Improving the likelihood of a résumé passing a skills based filter in résumé parsing software is only one example technical advantage of incorporating recommended skills generated by processes described herein.

Note that FIG. 7 is just one example of a method, and other methods including fewer, additional, or alternative steps are possible consistent with this disclosure.

FIG. 8 depicts a flowchart of another method for providing job skill recommendations for an electronic document.

In this example, method 800 begins at step 805 with obtaining, for a first user, one or more work history statements, wherein the one or more work history statements comprise one or more job skills from prior work experience. For example, step 805 may be performed by the one or more computing devices 110 described above with reference to FIG. 1 configured to implement components including, but not limited to, the experience level component 202, the job title component 204 depicted and described with reference to FIG. 2.

Method 800 continues at step 810 with obtaining, for the first user, a first skill set based on a current job title and experience level corresponding to the current job title. For example, step 810 may be performed by the one or more computing devices 110 described above with reference to FIG. 1 configured to implement components including, but not limited to, the work history component 301 depicted and described with reference to FIG. 3.

Method 800 proceeds to step 815 with determining a similarity score between a work history embeddings based on the one or more work history statements and skill embeddings based on one or more curated skills datasets. For example, the similarity score may be determined by one of the methodologies described with reference to the semantically similar selector component 330 depicted and described with reference to FIG. 3. For example, the similarly score may be determined using a Cosine similarity, a Jaccard similarity, or another methodology.

Method 800 proceeds to step 820 with selecting, for a second skill set, one or more second skills, from the one or more curated skills datasets, which correspond to the skill embeddings where the similarity score is greater than a predefined threshold. For example, step 820 may be performed by the one or more computing devices 110 described above with reference to FIG. 1 configured to implement components including, but not limited to, the semantically similar selector component 330 depicted and described with reference to FIG. 3 to form the second skill set 335.

Method 800 proceeds to step 825 with sorting the one or more second skills in the second skill set based on the similarity score to form an ordered second skill set. For example, step 825 may be performed by the one or more computing devices 110 described above with reference to FIG. 1 configured to implement components including, but not limited to, the skills sorting component 332 and/or the duplicate removal component 334 depicted and described with reference to FIG. 3 to form the second skill set 335.

Method 800 proceeds to step 830 with identifying, with a common skills component, one or more common skills between the first skill set and the ordered second skill set. For example, step 830 may be performed by the one or more computing devices 110 described above with reference to FIG. 1 configured to implement components including, but not limited to, the common skills component 342, which is part of the merge component 340 depicted and described with reference to FIG. 3.

Method 800 proceeds to step 835 with merging the first skill set and the ordered second skill set to form a merged skill set. For example, step 835 may be performed by the one or more computing devices 110 described above with reference to FIG. 1 configured to implement components including, but not limited to, the merge component 340 depicted and described with reference to FIG. 3.

Method 800 proceeds to step 840 with sorting the merged skill set into an ordered list. Aspects of the ordered list include the one or more common skills listed first, whereby repeated skills in each of the one or more common skills is removed, the one or more second skills listed second, and one or more first skills from the first skill set listed third. The one or more second skills are listed based on an ordered corresponding to the ordered second skill set. For example, step 840 may be performed by the one or more computing devices 110 described above with reference to FIG. 1 configured to implement components including, but not limited to, the sort skills component 346 depicted and described with reference to FIG. 3.

Method 800 proceeds to step 845 with populating one or more sections of the electronic document by selecting at least one skill from the ordered list. For example, step 845 may be performed by the one or more computing devices 110 described above with reference to FIG. 1 configured to implement components including, but not limited to, the populate component 350 depicted and described with reference to FIG. 3.

Note that FIG. 8 is just one example of a method, and other methods including fewer, additional, or alternative steps are possible consistent with this disclosure. Résumés created using aspects as discussed use the most prevalent phrasing for job skills, thus the likelihood of the résumé passing the filters of the résumé parsing software can be greatly increased. Improving the likelihood of a résumé passing a skills based filter in résumé parsing software is only one example technical advantage of incorporating recommended skills generated by processes described herein. Additionally, as discussed, document creation processes, such as method 700 and method 800 described herein provide specific technical processes for evaluating historical résumé for determining similar job titles and further determining relevant skills to recommend for including in the electronic document. For example, the process of generating embeddings for high-dimensional objects such as work history statements, job titles, and skills, reduces the dimensionality of the objects so they may be processed with fewer computing resources and in less time compared to analysis of raw high-dimensional data.

Example Document Creation Apparatus

FIG. 9 depicts an example document creation apparatus 900 configured to perform methods described herein. The document creation apparatus 900 depicted in FIG. 9 may be one or more of the computing devices 110 depicted and described herein and with reference to FIG. 1.

The document creation apparatus 900 includes one or more processors 902. Generally, processor(s) 902 may be configured to execute computer-executable instructions (e.g., software code) to perform various functions, as described herein.

The document creation apparatus 900 further includes a network interface(s) 904, which generally provides data access to any sort of data network, including personal area networks (PANs), local area networks (LANs), wide area networks (WANs), the Internet, and the like.

The document creation apparatus 900 further includes input(s) and output(s) 906, which generally provide means for providing data to and from the document creation apparatus 900, such as via connection to computing device peripherals, including user interface peripherals.

The document creation apparatus 900 further includes a memory 910 configured to store various types of components and data.

In this example, memory 910 includes an obtain component 921, a query component 922, generate embedding component(s) 923, determine component 924, select component 925, identify component 926, a merge component 927, a sort component 928, and a populate component 929.

Obtain component 921 may be configured to perform processes, for example, corresponding to step 705 of method 700 depicted and described with reference to FIG. 7 and/or steps 805 and 810 of method 800 depicted and described with reference to FIG. 8.

Query component 922 may be configured to perform processes, for example, corresponding to step 710 of the method depicted and described with reference to FIG. 7.

Generate embedding component(s) 923 may be configured to perform processes, for example, corresponding to steps 715-720 of method 700 depicted and described with reference to FIG. 7.

Determine component 924 may be configured to perform processes for example, corresponding to step 725 of method 700 depicted and described with reference to FIG. 7 and/or step 815 of method 800 depicted and described with reference to FIG. 8.

Select component 925 may be configured to perform processes for example, corresponding to step 730 of method 700 depicted and described with reference to FIG. 7 and/or step 820 of method 800 depicted and described with reference to FIG. 8.

Identify component 926 may be configured to perform processes for example, corresponding to step 735 of method 700 depicted and described with reference to FIG. 7 and/or step 830 of method 800 depicted and described with reference to FIG. 8.

Merge component 927 may be configured to perform processes for example, corresponding to step 740 of method 700 depicted and described with reference to FIG. 7 and/or step 835 of method 800 depicted and described with reference to FIG. 8.

Sort component 928 may be configured to perform processes for example, corresponding to step 745 of method 700 depicted and described with reference to FIG. 7 and/or step 825 and/or step 840 of method 800 depicted and described with reference to FIG. 8.

Populate component 929 may be configured to perform processes for example, corresponding to step 750 of method 700 depicted and described with reference to FIG. 7 and/or step 845 of method 800 depicted and described with reference to FIG. 8.

In this example, memory 910 also includes current job title data 940, experience level data 941, work history statement data 942, AI model(s) data 943, work embedding and/or skill embedding data 944, first skill set data 945, second skill set data 946, merged skill set data 947, ordered list data 948, and electronic document data 949.

The document creation apparatus 900 may be implemented in various ways. For example, the document creation apparatus 900 may be implemented within on-site, remote, or cloud-based computing devices.

The document creation apparatus 900 is just one example, and other configurations are possible. For example, in alternative embodiments, aspects described with respect to the document creation apparatus 900 may be omitted, added, or substituted for alternative aspects.

Example Clauses

Implementation examples are described in the following numbered clauses:

Clause 1: A method for providing job skill recommendations for an electronic document includes obtaining, for a first user, one or more work history statements, a current job title, and an experience level corresponding to the current job title, wherein the one or more work history statements comprises one or more job skills from prior work experience; querying one or more curated skills datasets to return a first skill set comprising one or more first skills associated with the current job title and the experience level; generating, with an artificial intelligence model, work history embeddings based on the one or more work history statements; generating, with the artificial intelligence model, skill embeddings based on the one or more curated skills datasets; determining a similarity score between the work history embeddings and the skill embeddings; selecting, for a second skill set, one or more second job skills, from the one or more curated skills datasets, that correspond to the skill embeddings where the similarity score is greater than a predefined threshold; identifying, with a common skills component, one or more common skills between the first skill set and the second skill set; merging the first skill set and the second skill set to form a merged skill set; sorting the merged skill set into an ordered list whereby the one or more common skills are listed first in the ordered list, the one or more second skills are listed second, and the one or more first skills are listed third; and populating one or more sections of the electronic document by selecting at least one skill from the ordered list.

Clause 2: The method of Clause 1, wherein querying the one or more curated skills datasets to return the first skill set comprises: filtering the one or more curated skills datasets to form a skills experience dataset comprising skills associated with the experience level; determining one or more similar job titles based on the current job title; filtering the skills experience dataset to form a refined skills dataset comprising skills associated with the one or more similar job titles and the current job title; and generating the first skill set as a response to the query based on the refined skills dataset.

Clause 3: The method of Clause 2, wherein determining the one or more similar job titles based on the current job title comprises: computing a semantic score between the current job title and the one or more similar job titles; and removing, from the one or more similar job titles, one or more job titles that correspond to the semantic score below a threshold score.

Clause 4: The method of any one of Clauses 1-3, wherein the one or more curated skills datasets for generating the skill embeddings is a filtered skills dataset formed by filtering the one or more curated skills datasets to comprise skills associated with the current job title and one or more similar job titles based on the current job title; and the one or more curated skills datasets for selecting the one or more second skills for the second skill set is the filtered skills dataset.

Clause 5: The method of any one of Clauses 1-4, wherein determining the similarity score between the work history embeddings and the skill embeddings comprises calculating Cosine similarities between the work history embeddings and the skill embeddings.

Clause 6: The method of any one of Clauses 1-5, wherein the one or more curated skills datasets comprise skills obtained from historical data and curated according to a job title and an experience level of other users.

Clause 7: The method of any one of Clauses 1-6, wherein the historical data comprises information from the other users having an engagement level greater than a predetermined level.

Clause 8: The method of any one of Clauses 1-7, wherein the engagement level corresponds to a completion percent of a résumé and the predetermined level is 80%.

Clause 9: The method of any one of Clauses 1-8, wherein the electronic document is at least one of a résumé or a job application.

Clause 10: A method for providing job skill recommendations for an electronic document. The method includes obtaining, for a first user, one or more work history statements, wherein the one or more work history statements comprise one or more job skills from prior work experience; obtaining, for the first user, a first skill set based on a current job title and experience level corresponding to the current job title; determining a similarity score between a work history embeddings based on the one or more work history statements and skill embeddings based on one or more curated skills datasets; selecting, for a second skill set, one or more second skills, from the one or more curated skills datasets, that correspond to the skill embeddings where the similarity score is greater than a predefined threshold; sorting the one or more second skills in the second skill set based on the similarity score to form an ordered second skill set; identifying, with a common skills component, one or more common skills between the first skill set and the ordered second skill set; merging the first skill set and the ordered second skill set to form a merged skill set; sorting the merged skill set into an ordered list. The one or more common skills are listed first, whereby repeated skills in each of the one or more common skills is removed. The one or more second skills are listed second, wherein the one or more second skills are listed based on an ordered corresponding to the ordered second skill set, and one or more first skills from the first skill set are listed third. The method further includes populating one or more sections of the electronic document by selecting at least one skill from the ordered list.

Clause 11: The method of Clause 10, wherein: the one or more curated skills datasets is a filtered skills dataset formed by filtering the one or more curated skills datasets to comprise skills associated with the current job title and one or more similar job titles based on the current job title; and the one or more curated skills datasets for selecting the one or more second skills for the second skill set is the filtered skills dataset.

Clause 12: The method of any one of Clauses 10-11, wherein: the one or more curated skills datasets comprise skills obtained from historical data and curated according to a job title and an experience level of other users; and the historical data comprises information from the other users having an engagement level corresponding to a completion percent of a résumé that is greater than 80%.

Clause 13: The method of any one of Clauses 10-12, wherein the one or more curated skills datasets is a filtered skills dataset formed by filtering the one or more curated skills datasets to comprise skills associated with the current job title and one or more similar job titles based on the current job title.

Clause 21: A processing system, comprising: a memory comprising computer-executable instructions; and a processor configured to execute the computer-executable instructions and cause the processing system to perform a method in accordance with any one of Clauses 1-13.

Clause 22: A processing system, comprising means for performing a method in accordance with any one of Clauses 1-13.

Clause 23: A non-transitory computer-readable medium comprising computer-executable instructions that, when executed by a processor of a processing system, cause the processing system to perform a method in accordance with any one of Clauses 1-13.

Clause 24: A computer program product embodied on a computer-readable storage medium comprising code for performing a method in accordance with any one of Clauses 1-13.

ADDITIONAL CONSIDERATIONS

The description provided above is intended to be illustrative and non-limiting. Thus, it will be apparent to one skilled in the art that modifications may be made to the present disclosure as described without departing from the scope of the claims set out below. Moreover, while the above description was provided with reference to the creation of enhanced documents and online documents, the disclosure is not thus limited, and may be naturally extended to other contexts.

The terminology used herein is for the purpose of describing particular aspects only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. The term "or a combination thereof" means a combination including at least one of the foregoing elements.

It will be apparent to those skilled in the art that various modifications and variations can be made in the present disclosure without departing from the spirit or scope of the disclosure. Thus, it is intended that the present disclosure cover the modifications and variations of this disclosure provided they come within the scope of the appended claims and their equivalents.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments, but should be defined only in accordance with the following claims and their equivalents.

What is claimed is:

1. A method for providing job skill recommendations for an electronic document, comprising:

obtaining, for a first user, one or more work history statements, a current job title, and an experience level corresponding to the current job title, wherein the one or more work history statements comprise one or more job skills from prior work experience;

querying one or more curated skills datasets to return a first skill set comprising one or more first skills associated with the current job title and the experience level;

sorting the one or more first skills into a hierarchy based on an associated prevalence count of each of the one or more first skills with respect to a historical set of skills within a historical dataset;

generating, with an artificial intelligence model, work history embeddings and skill embeddings based on multi-dimensional data associated with the one or more work history statements and the one or more curated skills datasets, wherein each work history embedding of the work history embeddings and each skill embedding of the skill embeddings comprises a representation of a corresponding portion of the multi-dimensional data in a reduced-dimensional vector space for similarity-based comparison between the work history embeddings and the skill embeddings;

determining a similarity score between pairs of the work history embeddings and the skill embeddings;

selecting, for a second skill set, one or more second skills, from the one or more curated skills datasets, that correspond to the skill embeddings where the similarity score between each corresponding pair of the pairs of the work history embeddings and the skill embeddings is greater than a predefined threshold;

identifying, with a common skills component, one or more common skills between the first skill set and the second skill set;

merging the first skill set and the second skill set to form a merged skill set;

sorting, using a sort component, the merged skill set into an ordered list based on ordering one or more skills of the merged skill set according to one or more of the similarity score of a frequency score based on a number of occurrences of respective skills of the one or more skills within the historical set of skills within the historical dataset, whereby the one or more common skills are listed first in the ordered list, the one or more second skills are listed second, and the one or more first skills are listed third; and populating one or more sections of the electronic document by selecting at least one skill from the ordered list.

2. The method of claim 1, wherein querying the one or more curated skills datasets to return the first skill set comprises:

filtering the one or more curated skills datasets to form a skills experience dataset comprising skills associated with the experience level;

determining one or more similar job titles based on the current job title;

filtering the skills experience dataset to form a refined skills dataset comprising skills associated with the one or more similar job titles and the current job title; and generating the first skill set as a response to the query based on the refined skills dataset.

3. The method of claim 2, wherein determining the one or more similar job titles based on the current job title comprises:

computing a semantic score between the current job title and the one or more similar job titles; and removing, from the one or more similar job titles, one or more job titles that correspond to the semantic score below a threshold score.

4. The method of claim 1, wherein:

the one or more curated skills datasets for generating the skill embeddings is a filtered skills dataset formed by filtering the one or more curated skills datasets to comprise skills associated with the current job title and one or more similar job titles based on the current job title; and the one or more curated skills datasets for selecting the one or more second skills for the second skill set is the filtered skills dataset.

5. The method of claim 1, wherein determining the similarity score between the pairs of work history embeddings and the skill embeddings comprises calculating Cosine similarities between each pair of the pairs of the work history embeddings and the skill embeddings.

6. The method of claim 1, wherein the one or more curated skills datasets comprise skills obtained from historical data and curated according to a job title and an experience level of other users.

7. The method of claim 6, wherein the historical dataset comprises information from the other users having an engagement level greater than a predetermined level.

8. The method of claim 7, wherein the engagement level corresponds to a completion percent of a résumé and the predetermined level is 80%.

9. A processing system for generating job skill recommendations for an electronic document, comprising:

one or more memories comprising computer-executable instructions; and one or more processors configured to execute the computer-executable instructions causing the processing system to:

obtain, for a first user, one or more work history statements, a current job title, and an experience level corresponding to the current job title, wherein the one or more work history statements comprise one or more job skills from prior work experience;

query one or more curated skills datasets to return a first skill set comprising one or more first skills associated with the current job title and the experience level;

sort the one or more first skills into a hierarchy based on an associated prevalence count of each of the one or more first skills with respect to a historical set of skills within a historical dataset;

generate, with an artificial intelligence model, work history embeddings and skill embeddings based on multi-dimensional data associated with the one or more work history statements and the one or more curated skills datasets, wherein each work history embedding of the work history embeddings and each skill embedding of the skill embeddings comprises a representation of a corresponding portion of the multi-dimensional data in a reduced-dimensional vector space for similarity-based comparison between the work history embeddings and the skill embeddings;

determine a similarity score between pairs of the work history embeddings and the skill embeddings;

select, for a second skill set, one or more second skills, from the one or more curated skills datasets, that correspond to the skill embeddings where the similarity score between each corresponding pair of the pairs of the work history embeddings and the skill embeddings is greater than a predefined threshold;

identify, with a common skills component, one or more common skills between the first skill set and the second skill set;

merge the first skill set and the second skill set to form a merged skill set;

sort, using a sorting component, the merged skill set into an ordered list based on ordering one or more skills of the merged skill set according to one or more of the similarity score or a frequency score based on a number of occurrences of respective skills of the one or more skills within the historical set of skills within the historical dataset, whereby the one or more common skills are listed first in the ordered list, the one or more second skills are listed second, and the one or more first skills are listed third; and populate one or more sections of the electronic document by selecting at least one skill from the ordered list.

10. The processing system of claim 9, wherein to query the one or more curated skills datasets to return the first skill set comprises causing the processing system to:

filter the one or more curated skills datasets to form a skills experience dataset comprising skills associated with the experience level;

determine one or more similar job titles based on the current job title;

filter the skills experience dataset to form a refined skills dataset comprising skills associated with the one or more similar job titles and the current job title; and generate the first skill set as a response to the query based on the refined skills dataset.

11. The processing system of claim 10, wherein to determine the one or more similar job titles based on the current job title comprises causing the processing system to:

compute a semantic score between the current job title and the one or more similar job titles; and remove, from the one or more similar job titles, one or more job titles that correspond to the semantic score below a threshold score.

12. The processing system of claim 9, wherein:

the one or more curated skills datasets for generating the skill embeddings is a filtered skills dataset formed by filtering the one or more curated skills datasets to comprise skills associated with the current job title and one or more similar job titles based on the current job title; and the one or more curated skills datasets for selecting the one or more second skills for the second skill set is the filtered skills dataset.

13. The processing system of claim 9, wherein to determine the similarity score between the pairs of work history embeddings and the skill embeddings comprises calculating cosine similarities between each pair of the pairs of the work history embeddings and the skill embeddings.

14. The processing system of claim 9, wherein the one or more curated skills datasets comprise skills obtained from historical data and curated according to a job title and an experience level of other users.

15. The processing system of claim 14, wherein the historical dataset comprises information from the other users having an engagement level corresponding to a completion percent of a résumé that is greater than 80%.

16. A method for providing job skill recommendations for an electronic document, comprising:

obtaining, for a first user, one or more work history statements, wherein the one or more work history statements comprise one or more job skills from prior work experience;

obtaining, for the first user, a first skill set based on a current job title and experience level corresponding to the current job title;

sorting the one or more first skills of the first skill set into a hierarchy based on an associated prevalence count of each of the one or more first skills with respect to a historical set of skills within a historical dataset;

determining a similarity score between pairs of work history embeddings based on the one or more work history statements and pairs of skill embeddings based on one or more curated skills datasets;

selecting, for a second skill set, one or more second skills, from the one or more curated skills datasets, that correspond to the pairs of skill embeddings or the pairs of work history embeddings where the similarity score is greater than a predefined threshold;

sorting the one or more second skills in the second skill set based on the similarity score to form an ordered second skill set;

identifying, with a common skills component, one or more common skills between the first skill set and the ordered second skill set;

merging the first skill set and the ordered second skill set to form a merged skill set;

sorting, using a sorting component, the merged skill set into an ordered list based on ordering one or more skills of the merged skill set according to one or more of the similarity score or a frequency score based on a number of occurrences of respective skills of the one or more skills within the historical set of skills within the historical dataset, wherein:

the one or more common skills are listed first, whereby repeated skills in each of the one or more common skills are removed, the one or more second skills are listed second, wherein the one or more second skills are listed based on an order corresponding to the ordered second skill set, and one or more first skills from the first skill set are listed third; and populating one or more sections of the electronic document by selecting at least one skill from the ordered list.

17. The method of claim 16, wherein:

the one or more curated skills datasets is a filtered skills dataset formed by filtering the one or more curated skills datasets to comprise skills associated with the current job title and one or more similar job titles based on the current job title; and the one or more curated skills datasets for selecting the one or more second skills for the second skill set is the filtered skills dataset.

18. The method of claim 16, wherein:

the one or more curated skills datasets comprise skills obtained from historical data and curated according to a job title and an experience level of other users; and the historical dataset comprises information from the other users having an engagement level corresponding to a completion percent of a résumé that is greater than 80%.

19. The method of claim 16, wherein the one or more curated skills datasets is a filtered skills dataset formed by filtering the one or more curated skills datasets to comprise skills associated with the current job title and one or more similar job titles based on the current job title.

20. The method of claim 16, wherein determining the similarity score between the pairs of the work history embeddings or the pairs of skill embeddings comprises calculating Cosine similarities between the pairs of work history embeddings or the pairs of skill embeddings.

* * * * *